(12) United States Patent
Shinohara et al.

(10) Patent No.: US 8,941,928 B2
(45) Date of Patent: Jan. 27, 2015

(54) IMAGING LENS AND IMAGING APPARATUS EQUIPPED WITH THE IMAGING LENS

(71) Applicant: Fujifilm Corporation, Tokyo (JP)

(72) Inventors: Yoshikazu Shinohara, Saitama-ken (JP); Michio Cho, Saitama-ken (JP); Sumihiro Nishihata, Saitama-ken (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 14/201,966

(22) Filed: Mar. 10, 2014

(65) Prior Publication Data

US 2014/0185150 A1 Jul. 3, 2014

Related U.S. Application Data

(63) Continuation of application No. PCT/JP2013/002171, filed on Mar. 29, 2013.

(60) Provisional application No. 61/637,589, filed on Apr. 24, 2012.

(30) Foreign Application Priority Data

Apr. 2, 2012 (JP) .................................. 2012-083859

(51) Int. Cl.
*G02B 3/02* (2006.01)
*G02B 13/18* (2006.01)
(52) U.S. Cl.
USPC ............................ 359/713; 359/740; 359/757
(58) Field of Classification Search
USPC ........................... 359/713, 739, 740, 757, 758
See application file for complete search history.

(56) References Cited

U.S. PATENT DOCUMENTS

| 8,830,595 | B2* | 9/2014 | Huang | 359/713 |
| 2002/0135890 | A1* | 9/2002 | Tochigi | 359/757 |
| 2008/0239515 | A1 | 10/2008 | Asami | |
| 2011/0261471 | A1 | 10/2011 | Taniyama | |
| 2012/0188654 | A1 | 7/2012 | Huang | |
| 2012/0243108 | A1 | 9/2012 | Tsai et al. | |
| 2013/0016278 | A1 | 1/2013 | Matsusaka et al. | |

FOREIGN PATENT DOCUMENTS

| CN | 202067015 | 12/2011 |
| JP | 2008-250136 | 10/2008 |
| JP | 2011-232449 | 11/2011 |
| KR | 2010-0040357 | 4/2010 |
| WO | 2011118554 | 9/2011 |

OTHER PUBLICATIONS

International Search Report PCT/JP2013/002171 dated Jun. 11, 2013.

* cited by examiner

*Primary Examiner* — Evelyn A. Lester
(74) *Attorney, Agent, or Firm* — Young & Thompson

(57) ABSTRACT

An imaging lens substantially includes six lenses, constituted by: a first lens having a positive refractive power and a convex surface that faces an object side; a second lens having a negative refractive power; a third lens having a positive refractive power; a fourth lens having a positive refractive power; a fifth lens having a negative refractive power and a concave surface that faces the object side; and an aspherical sixth lens having a negative refractive power, the surface of which is concave toward an image side in the vicinity of an optical axis and convex toward the image side at the peripheral portion thereof. The imaging lens satisfies a predetermined conditional formula.

18 Claims, 17 Drawing Sheets

FIG.2 EXAMPLE 2

FIG.4 EXAMPLE 4

FIG.6  EXAMPLE 6

FIG.7 EXAMPLE 7

EXAMPLE 5

EXAMPLE 8

IMAGING LENS AND IMAGING APPARATUS EQUIPPED WITH THE IMAGING LENS

TECHNICAL FIELD

The present invention is related to a fixed focus imaging lens for forming optical images of subjects onto an imaging element such as a CCD (Charge Coupled Device) and a CMOS (Complementary Metal Oxide Semiconductor). The present invention is also related to an imaging apparatus provided with the imaging lens that performs photography such as a digital still camera, a cellular telephone with a built in camera, a PDA (Personal Digital Assistant), a smart phone, and a portable gaming device.

BACKGROUND ART

Accompanying the recent spread of personal computers in households, digital still cameras capable of inputting image data such as photographed scenes and portraits into personal computers are rapidly becoming available. In addition, many cellular telephones and smart phones are being equipped with camera modules for inputting images. Imaging elements such as CCD's and CMOS's are employed in these devices having photography functions. Recently, miniaturization of these imaging elements is advancing, and there is demand for miniaturization of the entirety of the photography devices as well as imaging lenses to be mounted thereon. At the same time, the number of pixels in imaging elements is increasing, and there is demand for high resolution and high performance of imaging lenses. Performance corresponding to 5 megapixels or greater, and more preferably 8 megapixels or greater, is desired.

In response to such demands, an imaging lens having a five lens configuration or a six lens configuration, which are comparatively large numbers of lenses, may be considered in order to shorten total length and to obtain high resolution (refer to Korean Unexamined Patent Publication No. 2010-0040357 and Chinese Utility Model Publication No. 202067015).

DISCLOSURE OF THE INVENTION

Here, in an imaging lens configured by a comparatively large number of lenses as described above, and particularly in an imaging lens for use in a portable terminal, in which a shortened total length is desired, there is demand for an imaging lens having an image size capable of dealing with a large imaging element of approximately the same size as a conventional imaging element.

It would be preferable for the total length of the imaging lens having a six lens configuration disclosed in Korean Unexamined Patent Publication No. 2010-0040357 to be further shortened in order to meet this demand. The lens disclosed in Chinese Utility Model Publication No. 202067015 has a total length which is large with respect to the size of an imaging element. If this lens proportionately enlarged to correspond to a comparatively large imaging element, the total lengths thereof will become great. Therefore, the demand to further shorten the total lengths of this lenses will still remain.

The present invention has been developed in view of the foregoing problems. The object of the present invention is to provide an imaging lens that can realize high imaging performance from a central angle of view through peripheral angles of view while having a short total length and a large image size. It is another object of the present invention to provide an imaging apparatus equipped with the lens, which is capable of obtaining high resolution photographed images.

An imaging lens of the present invention substantially consists of six lenses, including:
a first lens having a positive refractive power and a convex surface that faces an object side;
a second lens having a negative refractive power;
a third lens having a positive refractive power;
a fourth lens having a positive refractive power;
a fifth lens having a negative refractive power and a concave surface that faces the object side; and
a sixth lens having a negative refractive power, which is of an aspherical shape with a surface which is concave toward an image side in the vicinity of an optical axis and convex toward the image side at the peripheral portion thereof; in this order from the object side; and satisfies the following conditional formula:

$$-4.0 < f/f6 < -0.8 \tag{1}$$

wherein f is the focal length of the entire system, and f6 is the focal length of the sixth lens.

In the imaging lens of the present invention, the configuration of each lens element in a six lens configuration is optimized, and particularly, the shapes of the first lens, the fifth lens, and the sixth lens are favorably configured. Therefore, a lens system having a short total length, a large image size, and further high imaging performance from a central angle of view through peripheral angles of view can be realized.

Note that in the imaging lens of the present invention, the expression "substantially consists of six lenses" means that the imaging lens of the present invention may also include lenses that practically have no power, optical elements other than lenses such as aperture stops and cover glass, and mechanical components such as lens flanges, a lens barrel, an imaging element, a blur correcting mechanism, etc., in addition to the six lenses.

The optical performance of the imaging lens of the present invention can be further improved by adopting the following favorable configurations.

In the imaging lens of the present invention, it is preferable for the second lens to be a meniscus lens having a convex surface that faces the object side.

In the imaging lens of the present invention, it is preferable for the first lens to be a meniscus lens having a convex surface that faces the object side.

In the imaging lens of the present invention, it is preferable for the fourth lens to be a meniscus lens having a concave surface that faces the object side.

In the imaging lens of the present invention, it is preferable for the fifth lens to be of an aspherical shape having an inflection point thereon.

It is preferable for the imaging lens of the present invention to satisfy the following Conditional Formulae (1-1) through (5-2). Note that any one of Conditional Formulae (1-1) through (5-2) may be satisfied, or arbitrary combinations of Conditional Formulae (1-1) through (5-2) may be satisfied.

$$-3.0 < f/f6 < -1.0 \tag{1-1}$$

$$-2.0 < f/f6 < -1.1 \tag{1-2}$$

$$vd5 < 35 \tag{2}$$

$$vd5 < 31 \tag{2-2}$$

$$0.8 < f/f123 < 1.3 \tag{3}$$

$$0.85 < f/f123 < 1.1 \quad (3\text{-}1)$$

$$0.9 < f/f123 < 1.0 \quad (3\text{-}2)$$

$$1 < f3/f1 < 5 \quad (4)$$

$$1.5 < f3/f1 < 4 \quad (4\text{-}1)$$

$$2 < f3/f1 < 3 \quad (4\text{-}2)$$

$$0.15 < f6/f2 < 1.30 \quad (5)$$

$$0.2 < f6/f2 < 0.7 \quad (5\text{-}1)$$

$$0.25 < f6/f2 < 0.5 \quad (5\text{-}2)$$

wherein f is the focal length of the entire system, f1 is the focal length of the first lens, f2 is the focal length of the second lens, f3 is the focal length of the third lens, f6 is the focal length of the sixth lens, f123 is the combined focal length of the first through third lenses, and vd5 is the Abbe's number of the fifth lens with respect to the d line.

An imaging apparatus of the present invention is equipped with the imaging lens of the present invention.

The imaging apparatus of the present invention is capable of obtaining high resolution image signals, based on high resolution optical images obtained by the imaging lens of the present invention.

In the imaging lens of the present invention, the configuration of each lens element in a six lens configuration is optimized, and particularly, the shapes of the first lens and the sixth lens are favorably configured. Therefore, a lens system having a short total length, a large image size, and further high imaging performance from a central angle of view through peripheral angles of view can be realized.

In addition, the imaging apparatus of the present invention outputs image signals corresponding to optical images formed by the imaging lens of the present invention which has the high imaging performance. Therefore, high resolution images cars be obtained.

BEST MODE FOR CARRYING OUT THE INVENTION

Hereinafter, embodiments of the present invention will be described in detail with reference to the attached drawings.

Figure 1:
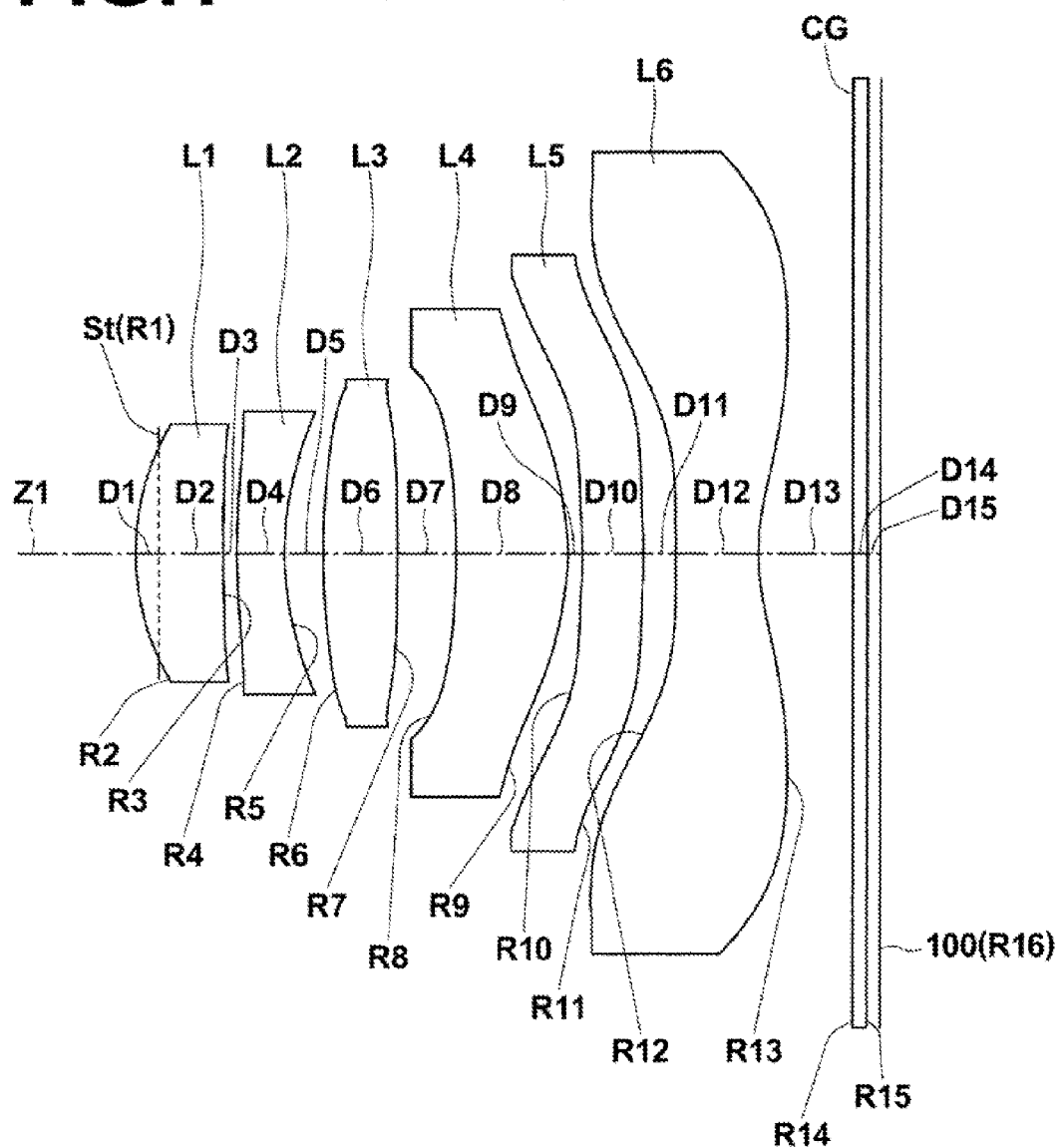
FIG. 1 is a sectional diagram that illustrates a first example of the configuration of an imaging lens according to an embodiment of the present invention, and corresponds to a lens of Example 1.

FIG. 1 illustrates a first example of the configuration of an imaging lens according to an embodiment of the present invention. This example corresponds to the configuration of a lens of Example 1 having the numerical values shown in Table 1 and Table 9, to be described later. Similarly, FIGS. 2 through 8 are sectional diagrams that illustrate second through eighth examples of the configurations of imaging lenses according to embodiments of the present invention. The examples of FIGS. 2 through 8 correspond to the configurations of lenses of Examples 2 through 8 having the numerical values shown in Tables 2 through 8 and Tables 10 through 16. In FIGS. 1 through 8, the symbol Ri represents the radii of curvature of ith surfaces, i being lens surface numbers that sequentially increase from the object side to the image side (imaging side), with the surface of a lens element most toward the object side designated as first. The symbol Di represents the distances between an ith surface and an i+1st surface along an optical axis Z1. Note that the basic configurations of the examples are the same, and therefore a description will be given of the imaging lens of FIG. 1 as a base, and the examples of FIGS. 2 through 8 will also be described as necessary.

The imaging lens L of the embodiment of the present invention is favorably employed in various imaging devices that employ imaging elements such as a CCD and a CMOS. The imaging lens L of the embodiment of the present invention is particularly favorable for use in comparatively miniature portable terminal devices, such as a digital still camera, a cellular telephone with a built in camera, a smart phone, and a PDA. The imaging lens L is equipped with a first lens L1, a second lens L2, a third lens L3, a fourth lens L4, a fifth lens L5, and a sixth lens L6 along the optical axis Z1, in this order from the object side.

Figure 17:
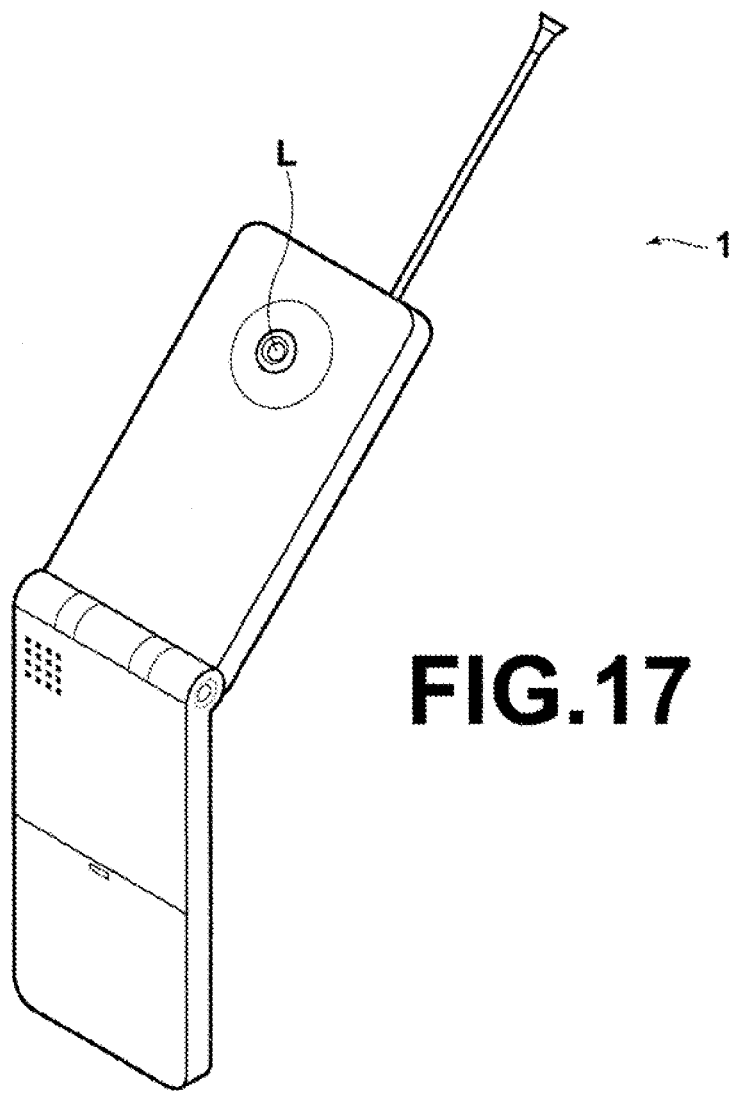
FIG. 17 is a diagram that illustrates a cellular telephone as an imaging apparatus equipped with the imaging lens of the present invention.

FIG. 17 schematically illustrates a cellular telephone as an imaging apparatus 1 according to an embodiment of the present invention. The imaging apparatus 1 of the embodiment of the present invention is equipped with the imaging lens L according to the embodiment of the present invention and an imaging element 100 (refer to FIG. 1) such as a CCD that outputs image signals corresponding to optical images formed by the imaging lens L. The imaging element 100 is provided at an imaging surface (image surface R16) of the imaging lens L.

Figure 18:
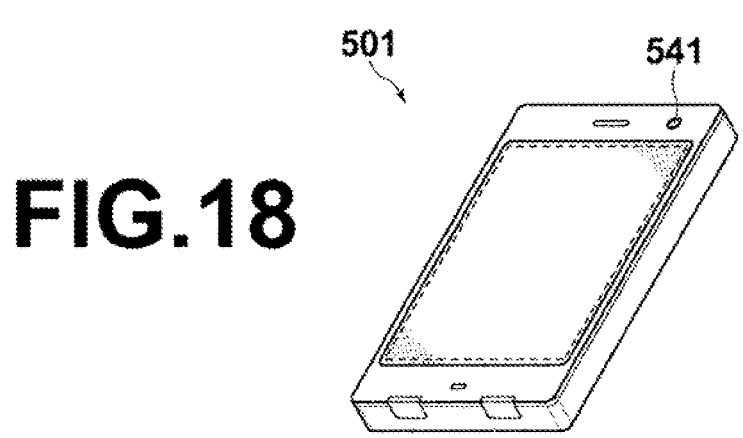
FIG. 18 is a diagram that illustrates a smart phone as an imaging apparatus equipped with the imaging lens of the present invention.

FIG. 18 schematically illustrates a smart phone as an imaging apparatus 501 according to an embodiment of the present invention. The imaging apparatus 501 of the embodiment of the present invention is equipped with a camera section 541 having the imaging lens L according to the embodiment of the present invention and an imaging element 100 (refer to FIG. 1) such as a CCD that outputs image signals corresponding to optical images formed by the imaging lens L. The imaging element 100 is provided at an imaging surface (image surface) of the imaging lens L.

Various optical members CG may be provided between the sixth lens L6 and the imaging element 100, depending on the configuration of the camera to which the lens is applied. A planar optical member CG such as a glass cover for protecting the imaging surface and infrared cutoff filters may be provided, for example. In this case, a planar glass cover having a coating having a filtering effect such as an infrared cutoff filter coating or an ND filter coating may be utilized as the optical member CG.

Alternatively, the optical member CG may be omitted, and a coating may be administered on the sixth lens L6 to obtain the same effect as that of the optical member CG. In this case, the number of parts can be reduced, and the total length can be shortened.

It is preferable for the imaging lens L to be equipped with an aperture stop St provided more toward the object side than the surface of the second lens L2 toward the object side. By providing the aperture stop St more toward the object side than the surface of the second lens L2 toward the object side, the incident angles of rays of light that pass through the optical system with respect to the imaging surface (imaging element) can be prevented from becoming excessively large, particularly at the peripheral portions of an imaging region. In order to increase this advantageous effect, it is more preferable for the aperture stop St to be provided more toward the object side than the surface of the first lens toward the object side. Note that the aperture stop being provided "more toward the object side than the surface of the second lens toward the object side" means that the position of the aperture stop along the direction of the optical axis is the same as or more toward the object side than the intersection of a marginal ray of light on the axis and the surface of the second lens L2 toward the object side. In addition, the aperture stop being provided "more toward the object side than the surface of the first lens toward the object side" means that the position of the aperture stop along the direction of the optical axis is the same as or more toward the object side than the intersection of a marginal ray of light on the axis and the surface of the first lens L1 toward the object side.

In the present embodiment, the first through eighth examples of the lenses (FIG. 1 through FIG. 8) are those in which the aperture stop St is provided more toward the object side than the surface of the first lens L1 toward the object side. In the present embodiment, the apertures stop St is provided more toward the image side than the peak of the surface of the first lens L1. However, the present invention is not limited to such a configuration, and the aperture stop St may be provided more toward the object side than the peak of the surface of the first lens L1. A configuration in which the aperture stop St is provided more toward the object side than the peak of the surface of the first lens L1 is somewhat disadvantageous compared to a configuration in which the aperture stop St is provided more toward the image side than the peak of the surface of the first lens L1 from the viewpoint of securing a sufficient amount of peripheral light. However, the incident angles of rays of light that pass through the optical system with respect to the imaging surface (imaging element) can be further prevented from becoming excessively large, particularly at the peripheral portions of an imaging region.

In the imaging lens L, the first lens L1 has a positive refractive power in the vicinity of the optical axis. The first lens L1 has a surface which is convex toward the object side in the vicinity of the optical axis. By the first lens L1 having a convex surface toward the object side, the surface of the lens system most toward the object side will be of a convex shape. Therefore, the rearward principal point can be positioned more toward the object side, and the total length can be favorably shortened. In addition, it is preferable for the first lens L1 to be a meniscus lens having a convex surface toward the object side in the vicinity of the optical axis. In this case, the aforementioned effect will become more prominent.

The second lens L2 has a negative refractive power in the vicinity of the optical axis. In addition, it is preferable for the second lens L2 to have a surface which is convex toward the object side in the vicinity of the optical axis. By the second lens L2 having a convex surface toward the object side in the vicinity of the optical axis, the total length can be favorably shortened. In addition, spherical aberrations becoming different for rays of light having different wavelengths can be suppressed.

The third lens L3 has a positive refractive power in the vicinity of the optical axis. In addition, the third lens L3 has a surface which is convex toward the object side in the vicinity of the optical axis. By the third lens L3 having a surface which is convex toward the object side in the vicinity of the optical axis, the shape of the surface is complementary with the shape of the surface of the second lens L2 which is concave toward the image side. Therefore, the distance between the second lens L2 and the third lens L3 along the optical axis can be shortened, and the total length can be shortened to a greater degree. Further, it is preferable for the third lens L3 to be of a biconvex shape in the vicinity of the optical axis. By the surface of the third lens L3 toward the image side being convex toward the image side, the refractive powers of the first lens L1 through the third lens L3 can be increased, and the shortening of the total length can be more favorably realized.

The fourth lens L4 has a positive refractive power in the vicinity of the optical axis. In addition, the fourth lens L4 is of a meniscus shape having a concave surface toward the object side in the vicinity of the optical axis. Correction of astigmatic aberrations is facilitated by the fourth lens being of a meniscus shape having a concave surface toward the object side in the vicinity of the optical axis.

The fifth lens L5 has a negative refractive power in the vicinity of the optical axis. In addition, it is preferable for the fifth lens L5 to be of an aspherical shape having an inflection point thereon. The "inflection point" on the surface of the fifth lens L5 toward the object side refers to a point at which the shape of the surface of the fifth lens L5 toward the image side changes from a convex shape to a concave shape (or from a concave shape to a convex shape) with respect to the image side. The position of the inflection point may be any arbitrary position within a range from the optical axis to the effective diameter of the surface of the fifth lens L5 toward the object side. Preferably, the at least one inflection point is provided at the peripheral portion of the surface. Note that here, the peripheral portion of the surface refers to a portion outside approximately 60% of a maximum effective radius of the surface in the radial direction. Field curvature can be favorably corrected, by the surface of the fifth lens L5 toward the object side being of an aspherical shape. In the embodiments described in the present specification, the aforementioned advantageous effect becomes more prominent, because the inflection point is provided in the peripheral portion of the surface.

The sixth lens L6 has a negative refractive power in the vicinity of the optical axis. In addition, the sixth lens L6 has a surface which is concave toward the image side in the vicinity of the optical axis. Shortening of the total length can be favorably realized by the by configuring the sixth lens L6 of the imaging lens L to have a surface which is concave toward the image side. Further, the sixth lens L6 is of an aspherical shape in which the surface thereof toward the image side is concave in the vicinity of the optical axis and convex at the peripheral portion. Increases in the incident angles of light rays that pass through the optical system and enter the imaging surface (imaging element) can be suppressed, particularly at the peripheral portion, by the sixth lens L6 being of an aspherical shape in which the surface thereof toward the image side is concave in the vicinity of the optical axis and convex at the peripheral portion. Thereby, deterioration of light reception efficiency can be suppressed, while realizing shortening of the total length. Note that here, the peripheral portion of the surface refers to a portion outside approximately 60% of a maximum effective radius of the surface in the radial direction.

In the imaging lens L, the first lens L1 having the positive refractive power, the second lens L2 having the negative refractive power, and the third lens L3 having the positive refractive power constitute the main refractive power of the lens system as a whole. By the configurations of the first lens L1 through the third lens L3 described above, a large image size can be realized, while favorably shortening the total length of the imaging lens with respect to pixel size. In addition, by the configurations of the first lens L1 through the third lens L3 described above, longitudinal chromatic aberration and spherical aberration can be favorably corrected. Further, the fourth lens L4 is provided to further increase the refractive power of the imaging lens L, the fifth lens L5 and the sixth lens L6 having negative refractive powers are provided adjacent to the fourth lens L4 toward the image side. Thereby, the rearward principal point can be positioned more toward the object side, and the total length of the imaging lens L can be favorably shortened.

It is preferable for at least one of the surfaces of each of the first lens L1 through the sixth lens L6 of the imaging L to be an aspherical surface, in order to improve performance.

In addition, it is preferable for each of the first lens L1 through the fifth lens L5 that constitute the imaging lens L to be a single lens, not a cemented lens. If the lenses are single lenses, the number of aspherical surfaces will be greater than that in the case that any of the lenses L1 through L5 is a cemented lens. Therefore, the degree of freedom in the design of each lens will increase, and the total length can be favorably shortened.

Next, the operation and effects of conditional formulae related to the imaging lens L will be described in greater detail.

First, the focal length f of the entire system and the focal length f6 of the sixth lens L6 satisfy Conditional Formula (1) below.

$$-4.0 < f/f6 < -0.8 \tag{1}$$

Conditional Formula (1) defines the preferred range of numerical values for focal length f of the entire system and the focal length f6 of the sixth lens L6. In the case that the value of f/f6 is less than the lower limit defined in Conditional Formula (1), the negative refractive power of the sixth lens L6 will become excessively strong with respect to the refractive power of the entire system, and field curvature will be excessively corrected. If the value of f/f6 exceeds the upper limit defined in Conditional Formula (1), the negative refractive power of the sixth lens L6 will become excessively strong with respect to the refractive power of the entire system, and it will become difficult to shorten the total length of the imaging lens. For these reasons, the length of the entire lens system can be shortened and field curvature can be favorably corrected, by satisfying the range defined in Conditional Formula (1). It is preferable for Conditional Formula (1-1) below to be satisfied, and more preferable for Conditional Formula (1-2) to be satisfied, in order to cause this advantageous effect to become more prominent.

$$-3.0 < f/f6 < -1.0 \tag{1-1}$$

$$-2.0 < f/f6 < -1.1 \tag{1-2}$$

The Abbe's number vd5 of the fifth lens L5 with respect to the a line satisfies Conditional Formula (2) below.

$$vd5 < 35 \tag{2}$$

Conditional Formula (2) defines the preferred range of numerical values for the Abbes number vd5 of the fifth lens L5 with respect to the d line. If the value of vd5 exceeds the upper limit defined in Conditional Formula (2), longitudinal chromatic aberrations will become more likely to be insufficiently corrected, or lateral chromatic aberrations at the peripheral portion of an imaging region will become excessive. Therefore, it will become difficult to sufficiently correct lateral chromatic aberrations and longitudinal chromatic aberrations. The fifth lens L5 can be constituted by a high dispersion material by satisfying Conditional Formula (2), and longitudinal chromatic aberrations and lateral chromatic aberrations at the peripheral portion of the imaging region can be favorably corrected. From this viewpoint, it is more preferable for Conditional Formula (2-1) below to be satisfied, and more preferable for Conditional Formula (2-2) to be satisfied.

$$vd5<33 \quad (2\text{-}1)$$

$$vd5<31 \quad (2\text{-}2)$$

In addition, it is preferable for the focal length f of the entire system and the combined focal length f123 of the first lens L1 through the third lens L3 to satisfy Conditional Formula (3) below.

$$0.8<f/f123<1.3 \quad (3)$$

Conditional Formula (3) defines the preferred range of numerical values for the focal length f of the entire system and the combined focal length f123 of the first through third lenses. In the case that the value of f/f123 is less than the lower limit defined in Conditional Formula (3), the refractive power of the first lens L1 through the third lens L3 will become excessively weak with respect to the refractive power of the entire system, it will become difficult to shorten the total length of the lens system. In the case that the value of f/f123 exceeds the upper limit defined in Conditional Formula (3), the refractive power of the first lens L1 through the third lens L3 will become excessively strong with respect to the refractive power of the entire system. Although this is advantageous from the viewpoint of shortening the total length of the imaging lens, it will become necessary to increase the negative refractive power of the fourth lens L4 through the sixth lens L6 which are positioned more toward the image side than the third lens L3, resulting in field curvature being corrected insufficiently. For these reasons, the total length of the lens system can be shortened while favorably correcting field curvature, by satisfying the range defined in Conditional Formula (3). It is preferable for Conditional Formula (3-1) below to be satisfied, and more preferable for Conditional Formula (3-2) to be satisfied, in order to cause this advantageous effect to become more prominent.

$$0.85<f/f123<1.1 \quad (3\text{-}1)$$

$$0.9<f/f123<1.0 \quad (3\text{-}2)$$

In addition, the focal length f3 of the third lens L3 and the focal length f1 of the first lens L1 satisfy Conditional Formula (4) below.

$$1<f3/f1<5 \quad (4)$$

Conditional Formula (4) defines the preferred range of numerical values for the focal length f3 of the third lens L3 and the focal length f1 of the first lens L1. In the case that the value of f3/f1 is less than the lower limit defined in Conditional Formula (4), the positive refractive power of the first lens L1 will become excessively weak with respect to the positive refractive power of the third lens L3, and it will become difficult to shorten the total length of the imaging lens. In the case that the value of f3/f1 exceeds the upper limit defined in Conditional Formula (4), the positive refractive power of the first lens L1 will become excessively strong with respect to the positive refractive power of the third lens L3, and it will become necessary to increase the negative refractive power of the fourth lens L4 through the sixth lens L6 which are positioned more toward the image side than the third lens L3, resulting in field curvature being corrected excessively. For these reasons, the total length of the lens system can be shortened while favorably correcting field curvature, by satisfying the range defined in Conditional Formula (4). It is preferable for Conditional Formula (4-1) below to be satisfied, and more preferable for Conditional Formula (4-2) to be satisfied, in order to cause this advantageous effect to become more prominent.

$$1.5<f3/f1<4 \quad (4\text{-}1)$$

$$2<f3/f1<3 \quad (4\text{-}2)$$

In addition, the focal length f6 of the sixth lens L6 and the focal length f2 of the second lens L2 satisfy Conditional Formula (5) below.

$$0.15<f6/f2<1.30 \quad (5)$$

Conditional Formula (5) defines the preferred range of numerical values for the focal length f6 of the sixth lens L6 and the focal length f2 of the second lens L2. In the case that the value of f6/f2 exceeds the upper limit defined in Conditional Formula (5), the refractive power of the second lens L2 will be excessively weak with respect to the refractive power of the sixth lens L6, and correction of field curvature will become insufficient. If the value of f6/f2 is less than the lower limit defined in Conditional Formula (5), the refractive power of the second lens L2 will become excessively weak with respect to the refractive power of the sixth lens L6, and correction of longitudinal chromatic aberrations will become insufficient. For these reasons, field curvature and longitudinal chromatic aberrations can be favorably corrected, by satisfying the range defined in Conditional Formula (5). It is preferable for Conditional Formula (5-1) below to be satisfied, and more preferable for Conditional Formula (5-2) to be satisfied, in order to cause this advantageous effect to become more prominent.

$$0.2<f6/f2<0.7 \quad (5\text{-}1)$$

$$0.25<f6/f2<0.5 \quad (5\text{-}2)$$

As described above, in the imaging lenses L according to the embodiments of the present invention, the configuration of each lens element in a six lens configuration is optimised, and particularly, the shapes of the first lens and the sixth lens are favorably configured. Therefore, a lens system having a short total length, a large image size, and high resolution can be realized.

Further improved imaging performance can be realized by satisfying preferred conditions appropriately. In addition, the imaging apparatuses according to the embodiments of the present invention output image signals corresponding to optical images formed by the high performance imaging lenses L according to the embodiments of the present invention. Therefore, images having high resolution from a central angle of view to peripheral angles of view can be obtained.

Next, specific examples of numerical values of the imaging lens of the present invention will be described. A plurality of examples of numerical values will be summarized and explained below.

Table 1 and Table 9 below show specific lens data corresponding to the configuration of the imaging lens illustrated in FIG. 1. Table 1 shows basic lens data of the imaging lens, and Table 9 shows data related to aspherical surfaces. In the lens data of Table 1, ith (i=1, 2, 3, . . . ) lens surface numbers that sequentially increase from the object side to the image side, with the lens surface at the most object side designated as first (the aperture stop St being number 1), are shown in the column Si. The radii of curvature (mm) of ith surfaces corresponding to the symbols Ri illustrated in FIG. 1 are shown in the column Ri. The distances between an ith surface and an i+1st surface along the optical axis Z are shown in the column Di. The refractive indices of jth (j=1, 2, 3, . . . ) optical elements from the object side to the image side with respect to the d line (wavelength: 587.6 nm) are shown in the column Ndj. The Abbe's numbers of the jth optical element with respect to the d line are shown in the column νdj. Note that the values of the focal length f (mm) of the entire system and back focus Bf (mm) are shown as data for each lens datum. Note that the back focus Bf is represented as values converted to spatial distances.

In the imaging lens of Example 1, both of the surfaces of the first lens L1 through the sixth lens L6 are all aspherical in shape. In the basic lens data of Table 1, numerical values of radii of curvature in the vicinity of the optical axis (paraxial radii of curvature) are shown as the radii of curvature of the aspherical surfaces.

Table 9 shows aspherical surface data of the imaging lens of Example 1. In the numerical values shown as the aspherical surface data, the symbol "E" indicates that the numerical value following thereafter is a "power index" having 10 as a base, and that the numerical value represented by the index function having 10 as a base is to be multiplied by the numerical value in front of "E". For example, "1.0E−02" indicates that the numerical value is "1.0·10$^{-2}$".

The values of coefficients Ai and K represented by the aspherical surface shape formula (A) below are shown as the aspherical surface data. In greater detail, Z is the length (mm) of a normal line that extends from a point on the aspherical surface having a height h to a plane (a plane perpendicular to the optical axis) that contacts the peak of the aspherical surface.

$$Z = C \cdot h^2 / (1 + (1 - K \cdot C^2 \cdot h^2)^{1/2}) + \Sigma A_i \cdot h^i$$

wherein: Z is the depth of the aspherical surface (mm), h is the distance from the optical axis to the surface of the lens (height) (mm), C is the paraxial curvature=1/R (R is the paraxial radius of curvature), Ai is an ith ordinal aspherical surface coefficient (i is an integer 3 or greater), and K is an aspherical surface coefficient.

Figure 2:
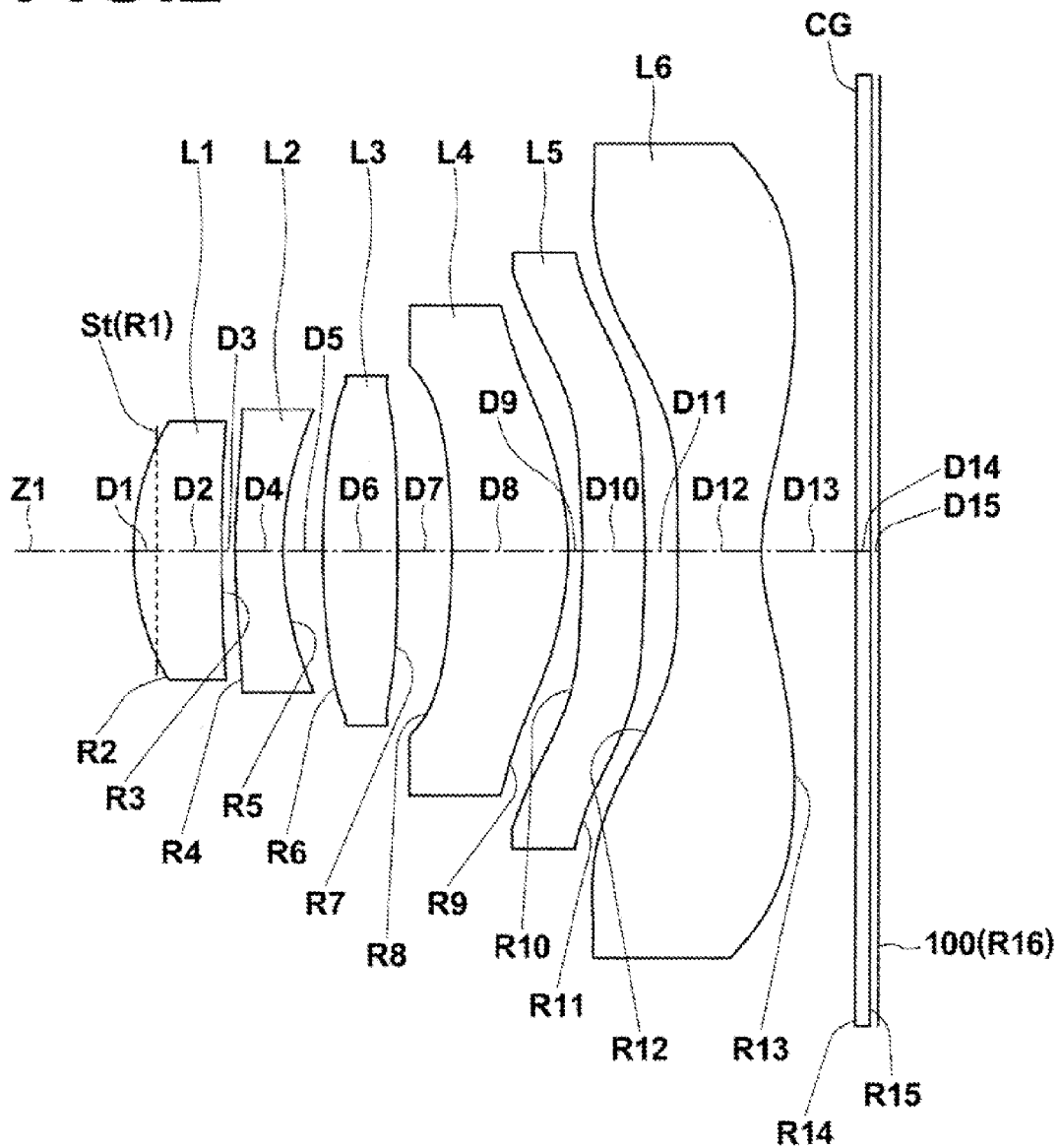
FIG. 2 is a sectional diagram that illustrates a second example of the configuration of an imaging lens according to an embodiment of the present invention, and corresponds to a lens of Example 2.
Figure 3:
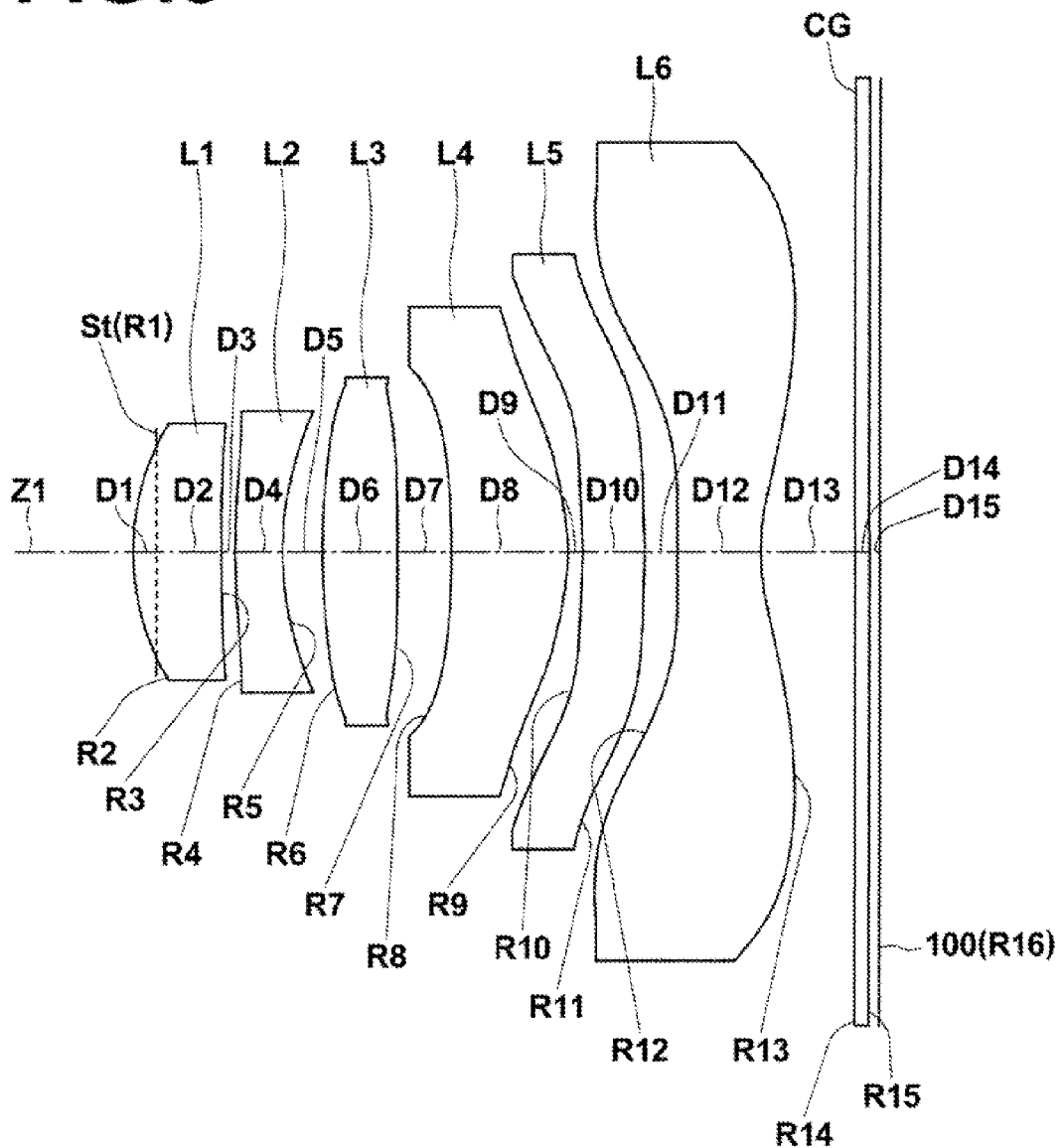
FIG. 3 is a sectional diagram that illustrates a third example of the configuration of an imaging lens according to an embodiment of the present invention, and corresponds to a lens of Example 3.
Figure 4:
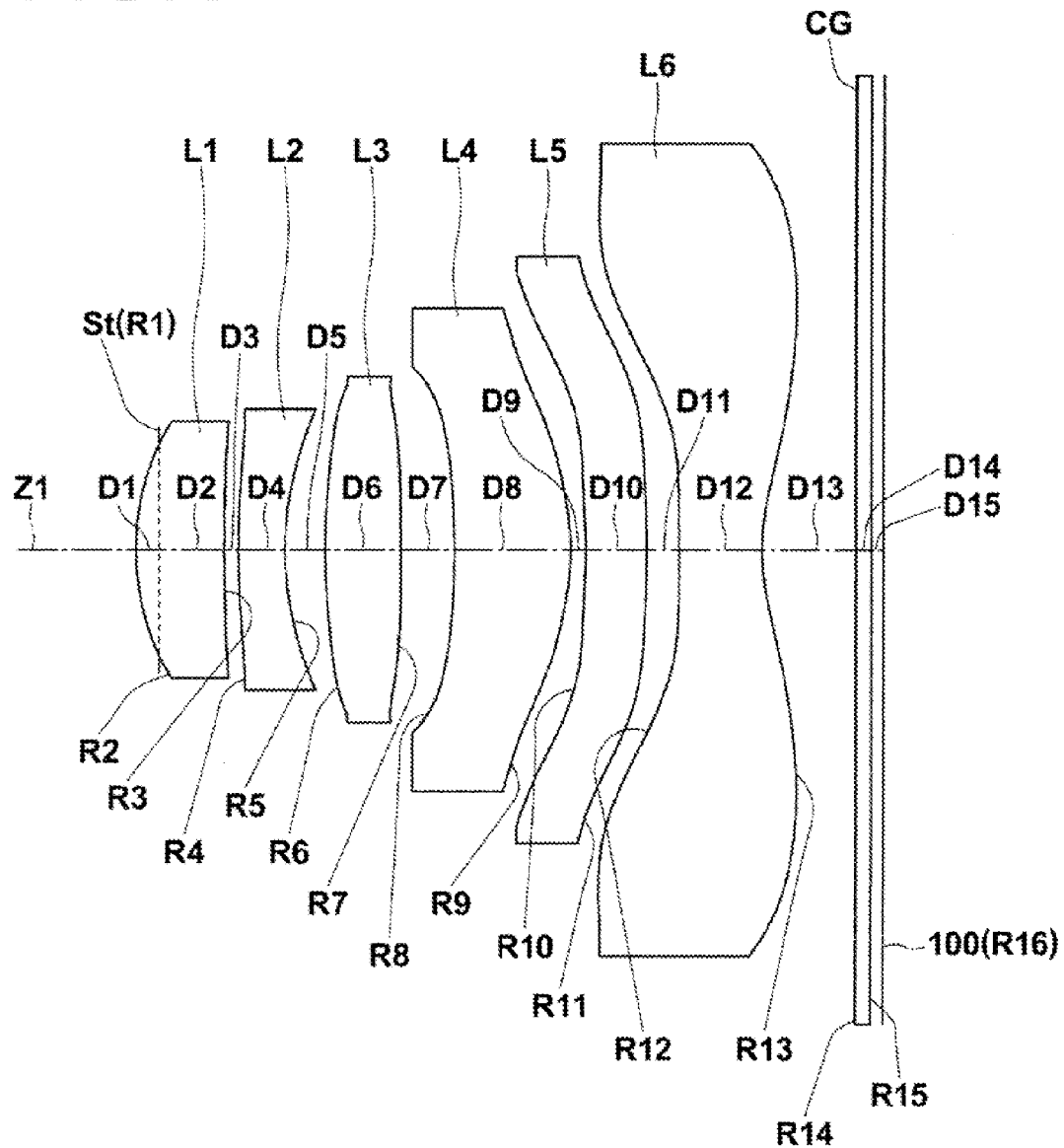
FIG. 4 is a sectional diagram that illustrates a fourth example of the configuration of an imaging lens according to an embodiment of the present invention, and corresponds to a lens of Example 4.
Figure 5:
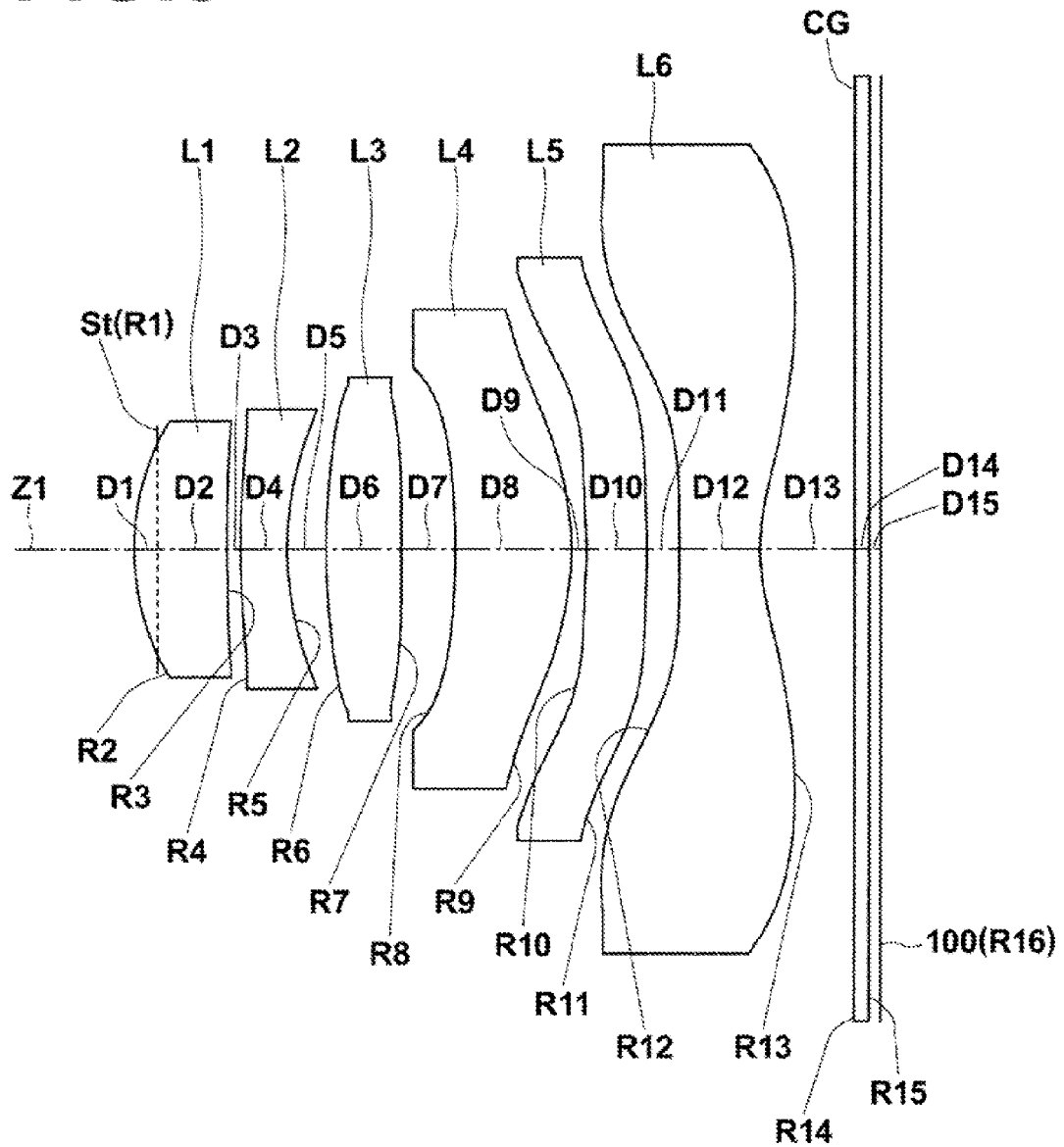
FIG. 5 is a sectional diagram that illustrates a fifth example of the configuration of an imaging lens according to an embodiment of the present invention, and corresponds to a lens of Example 5.
Figure 6:
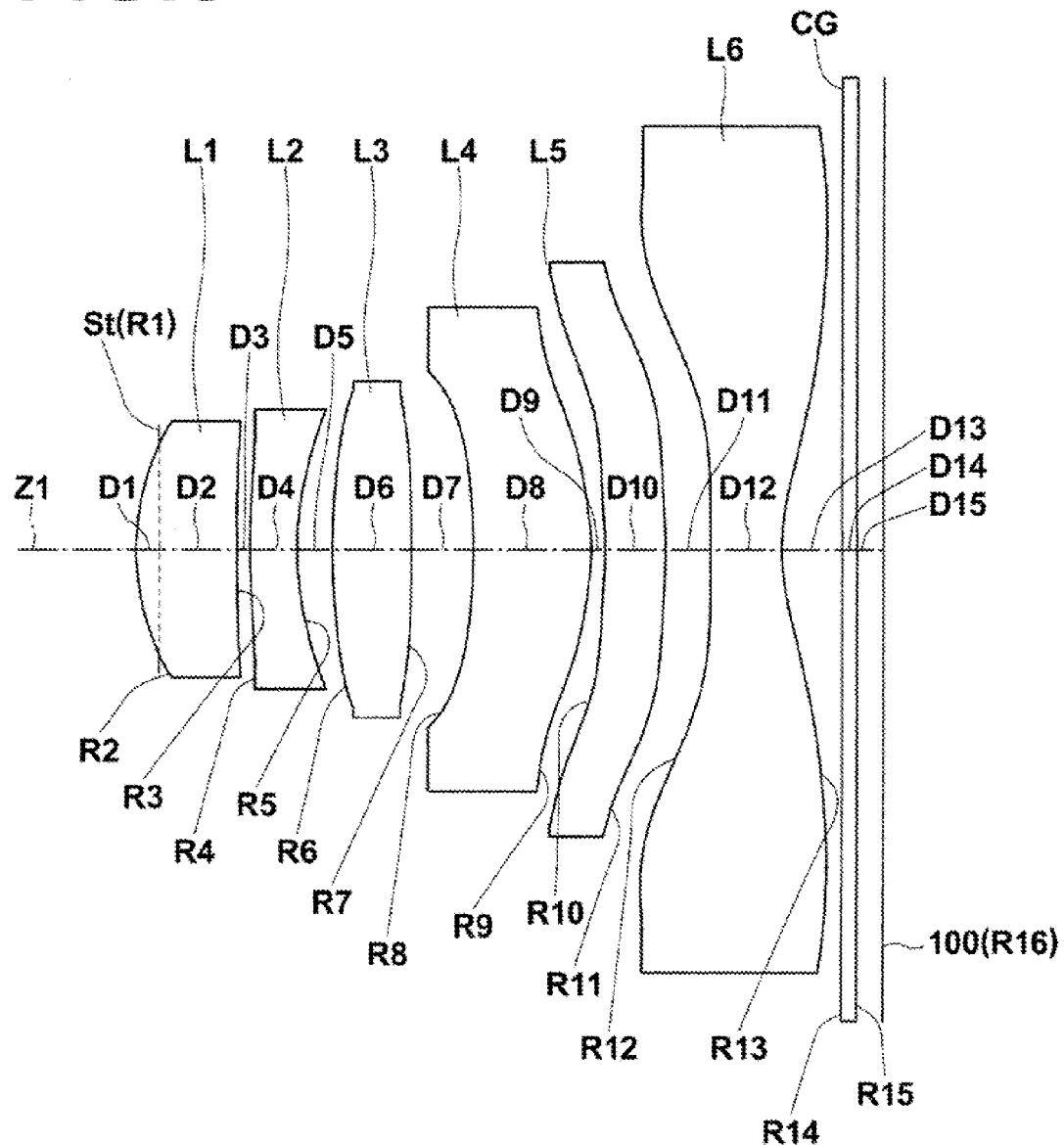
FIG. 6 is a sectional diagram that illustrates a sixth example of the configuration of an imaging lens according to an embodiment of the present invention, and corresponds to a lens of Example 6.
Figure 7:
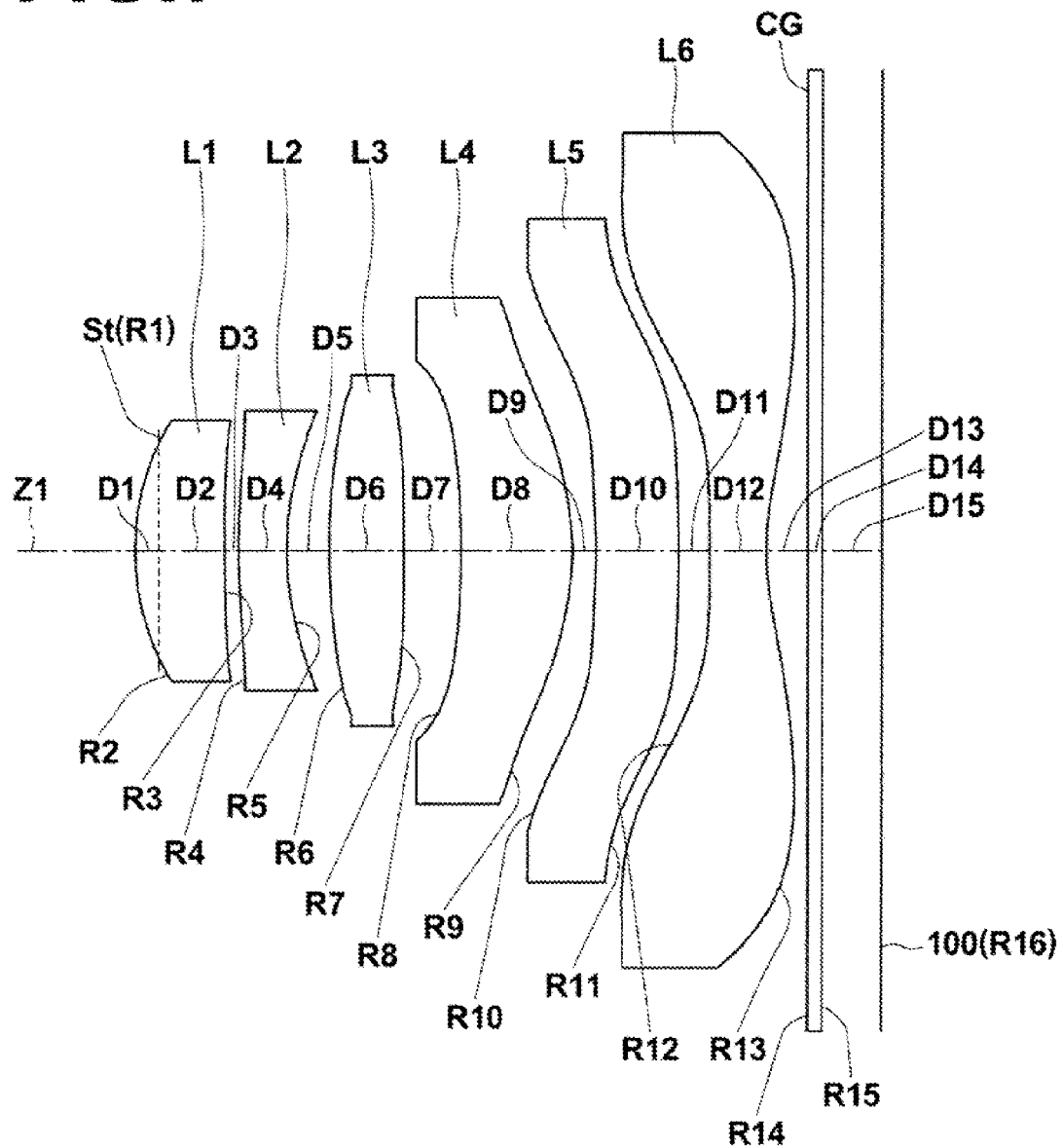
FIG. 7 is a sectional diagram that illustrates a seventh example of the configuration of an imaging lens according to an embodiment of the present invention, and corresponds to a lens of Example 7.
Figure 8:
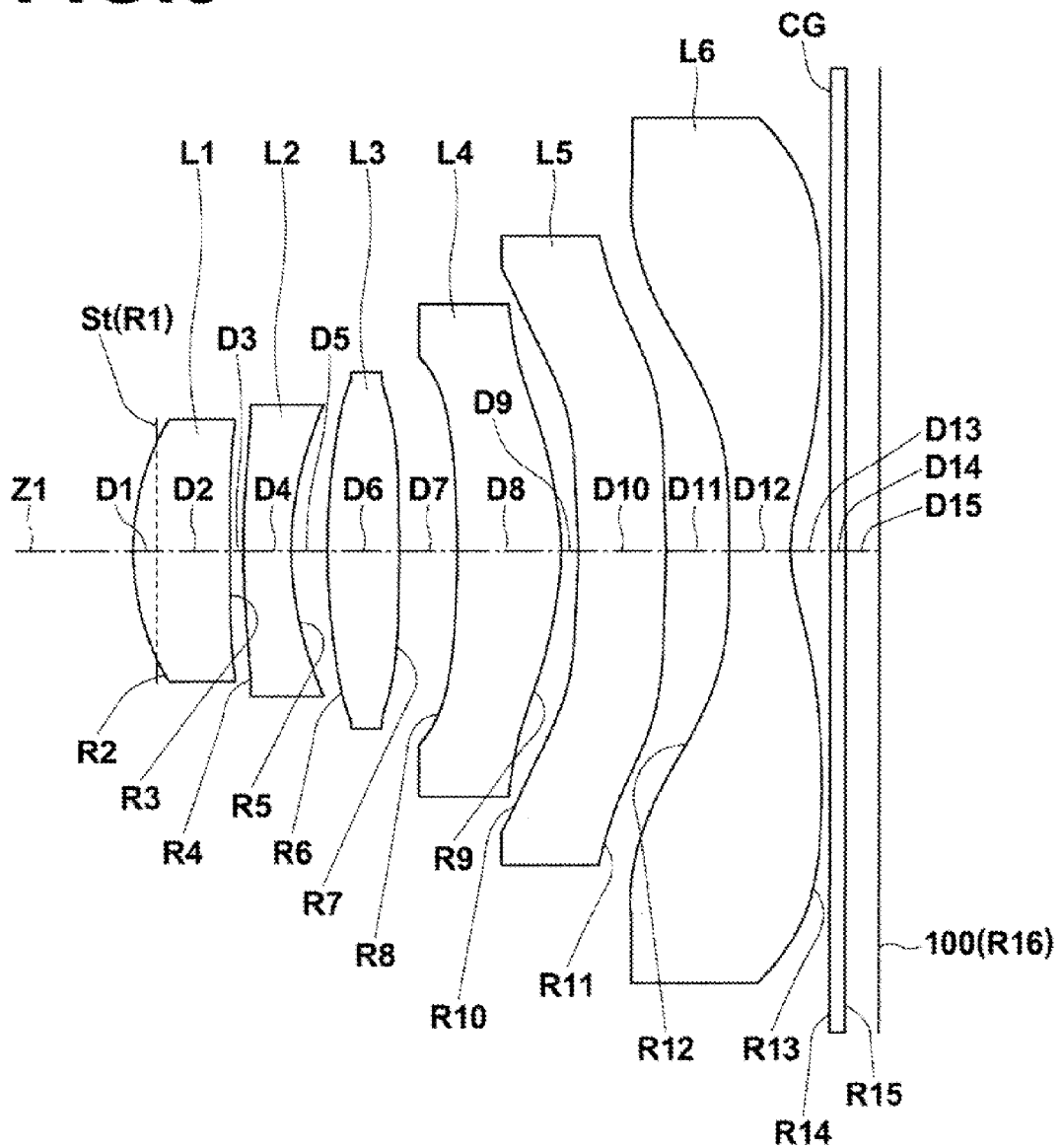
FIG. 8 is a sectional diagram that illustrates an eighth example of the configuration of an imaging lens according to an embodiment of the present invention, and corresponds to a lens of Example 8.

Specific lens data corresponding to the configuration of the imaging lens illustrated in FIG. 2 are shown in Table 2 and Table 10 as Example 2 in the same manner as that for the imaging lens of Example 1. Similarly, specific lens data corresponding to the configurations of the imaging lenses illustrated in FIGS. 3 through 8 are shown in Tables 3 through 8 and Tables 11 through 16 as Example 3 through Example 8. In the imaging lenses of Examples 1 through 8, both of the surfaces of the first lens L1 through the sixth lens L6 are all aspherical surfaces.

Figure 9:
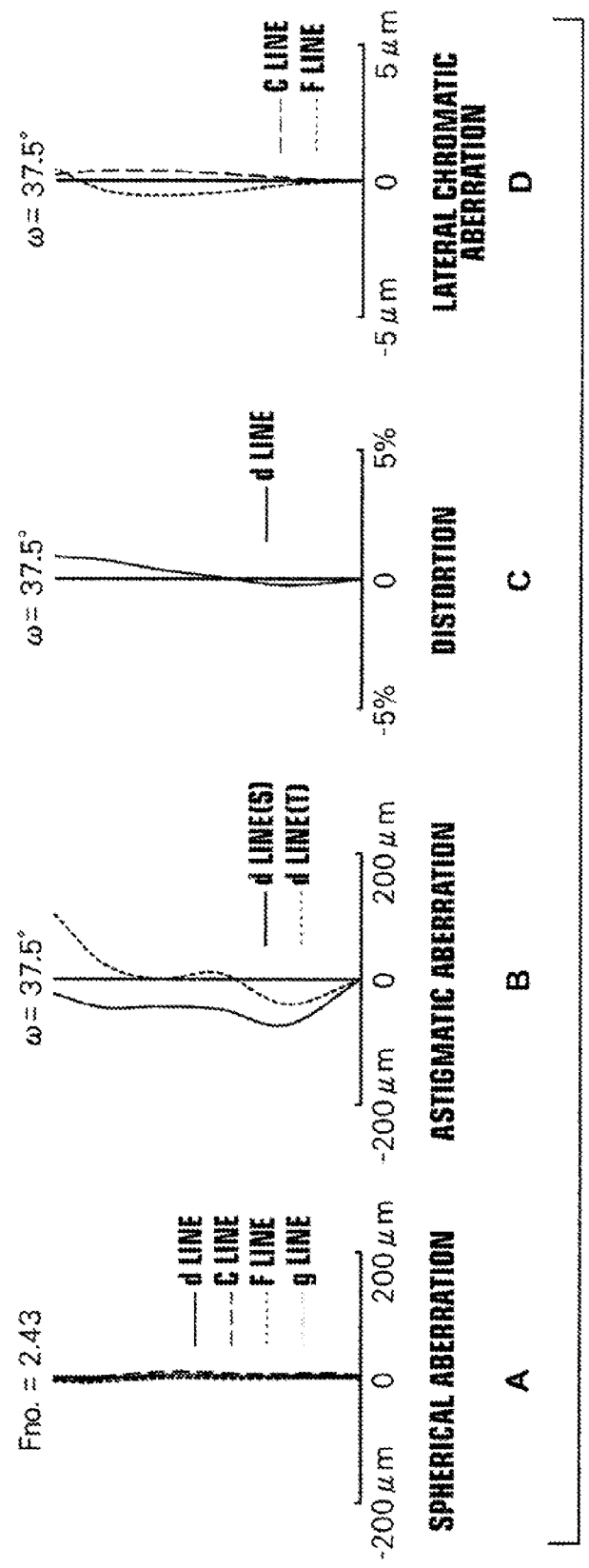
FIG. 9 is a collection of diagrams that illustrate aberrations of the imaging lens of Example 1, wherein A illustrates spherical aberration, B illustrates astigmatic aberration (field curvature), C illustrates distortion, and D illustrates lateral chromatic aberration.

A through D of FIG. 9 are diagrams that illustrate the spherical aberration, the astigmatic aberration, the distortion, and the lateral chromatic aberration of the imaging lens of Example 1, respectively. Each of the diagrams that illustrate the spherical aberration, the astigmatic aberration (field curvature), and the distortion illustrate aberrations using the d line (wavelength: 587.6 nm) as a standard wavelength. The diagrams that illustrate spherical aberration and lateral chromatic aberration, also show aberrations related to the F line (wavelengths: 486.1 nm) and the C line (wavelength: 656.27 nm). In addition, the diagram that illustrates spherical aberration also show aberrations related to the g line (wavelength: 435.83 nm). In the diagrams that illustrate astigmatic aberrations, aberrations in the sagittal direction (S) are indicated by solid lines, while aberrations in the tangential direction (T) are indicated by broken lines. In addition, "Fno." denotes F numbers, and "ω" denotes half angles of view.

Figure 10:
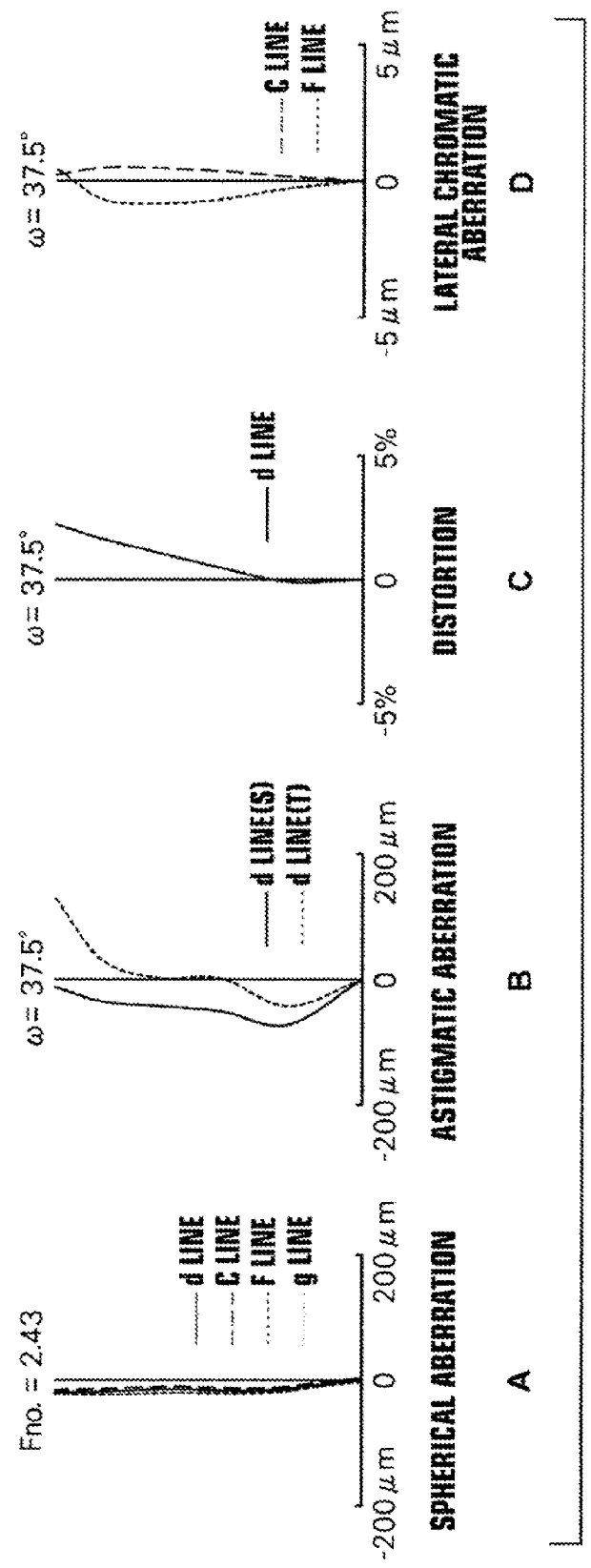
FIG. 10 is a collection of diagrams that illustrate aberrations of the imaging lens of Example 2, wherein A illustrates spherical aberration, B illustrates astigmatic aberration (field curvature), C illustrates distortion, and D illustrates lateral chromatic aberration.
Figure 11:
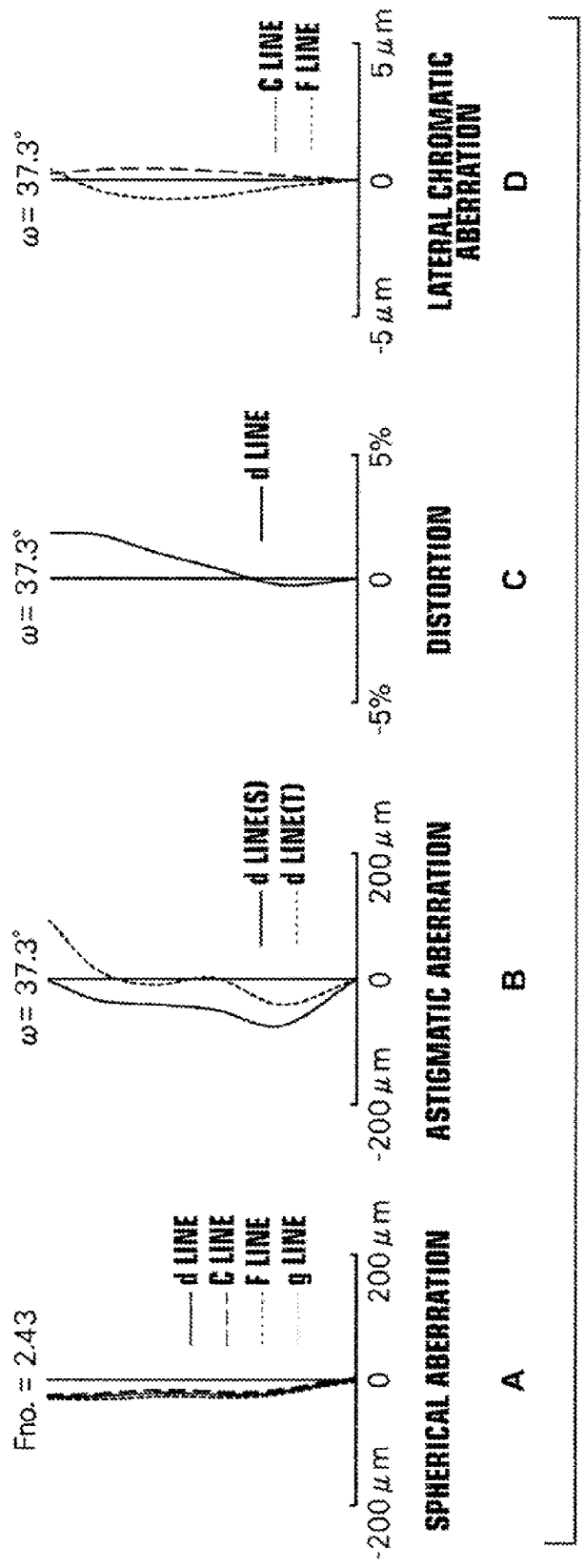
FIG. 11 is a collection of diagrams that illustrate aberrations of the imaging lens of Example 3, wherein A illustrates spherical aberration, B illustrates astigmatic aberration (field curvature), C illustrates distortion, and D illustrates lateral chromatic aberration.
Figure 12:
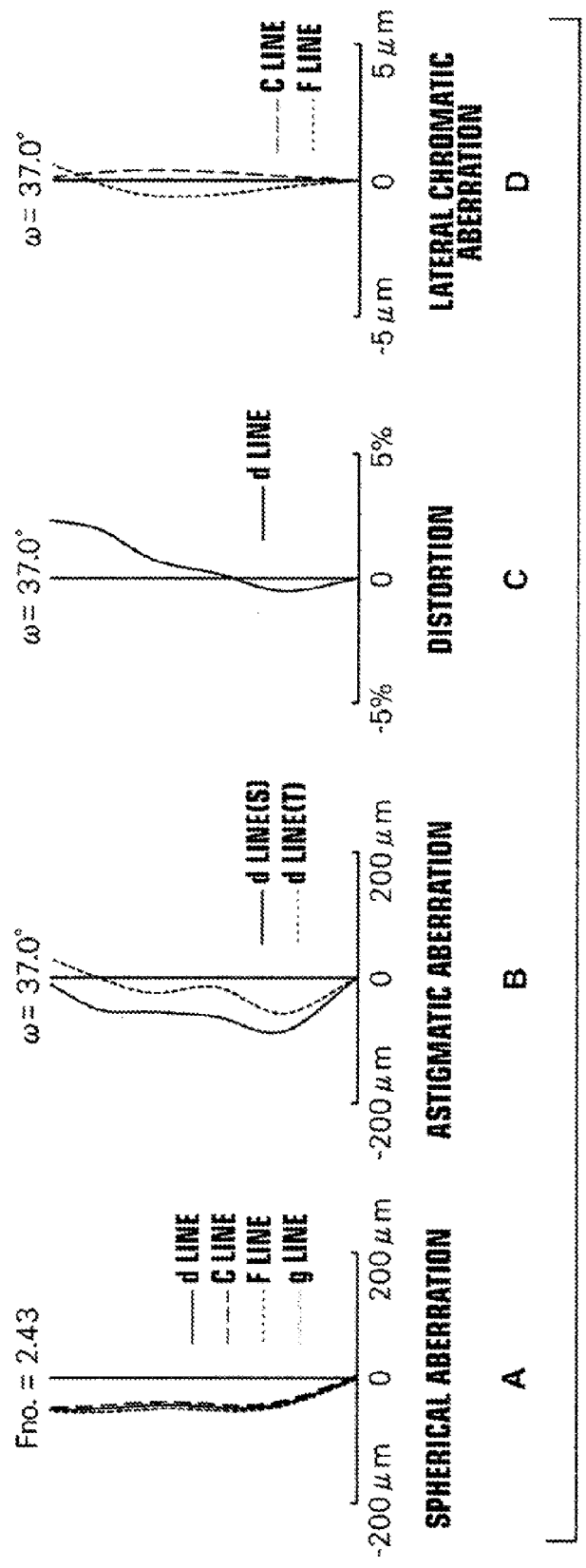
FIG. 12 is a collection of diagrams that illustrate aberrations of the imaging lens of Example 4, wherein A illustrates spherical aberration, B illustrates astigmatic aberration (field curvature), C illustrates distortion, and D illustrates lateral chromatic aberration.
Figure 13:
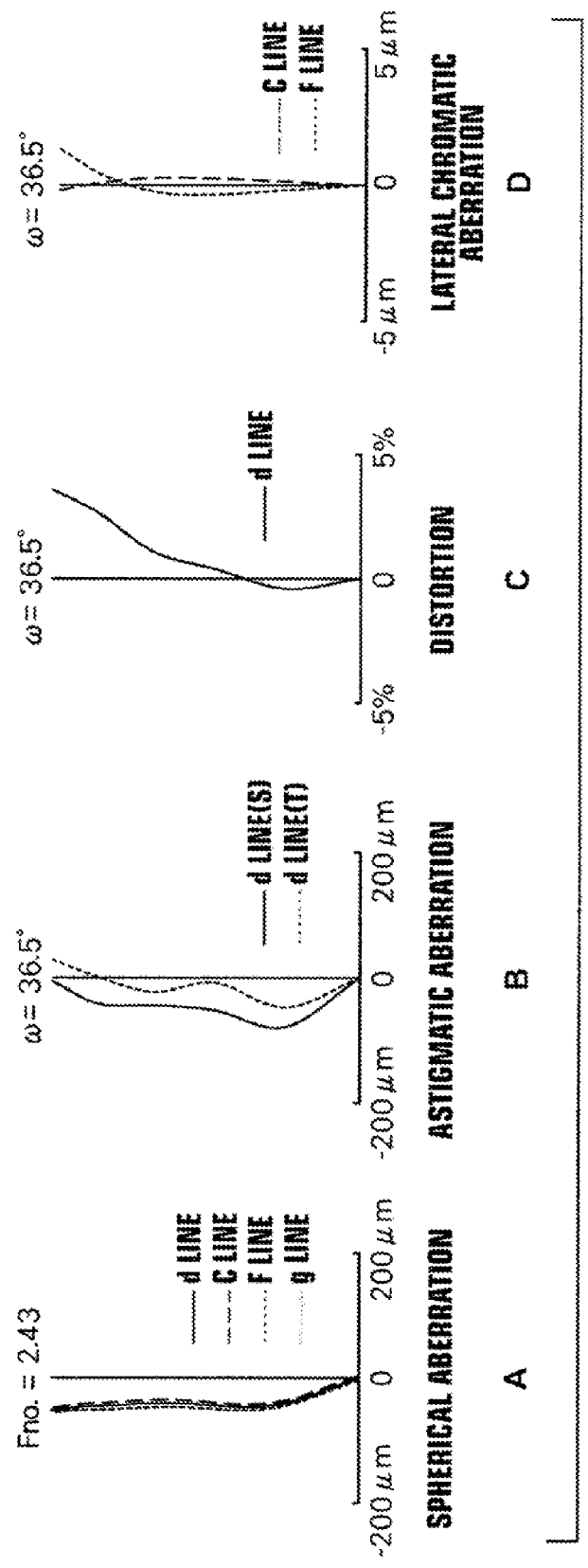
FIG. 13 is a collection of diagrams that illustrate aberrations of the imaging lens of Example 5, wherein A illustrates spherical aberration, B illustrates astigmatic aberration (field curvature), C illustrates distortion, and D illustrates lateral chromatic aberration.
Figure 14:
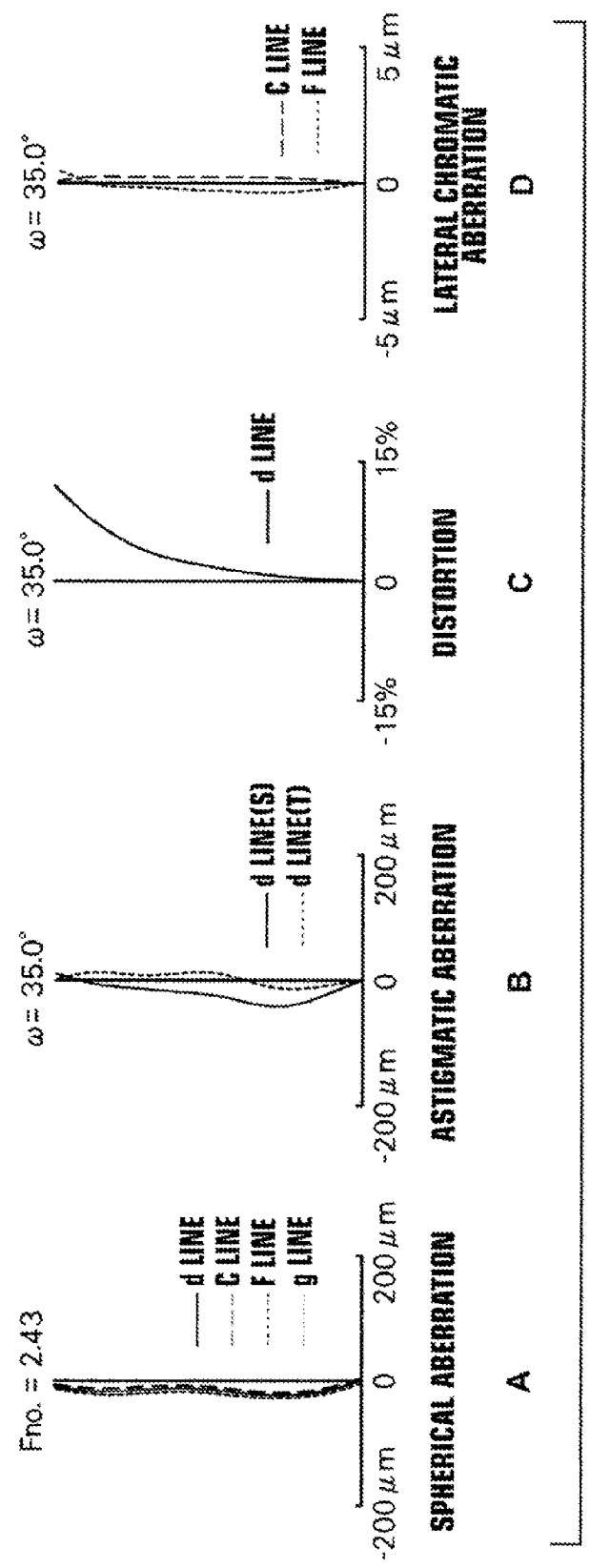
FIG. 14 is a collection of diagrams that illustrate aberrations of the imaging lens of Example 6, wherein A illustrates spherical aberration, B illustrates astigmatic aberration (field curvature), C illustrates distortion, and D illustrates lateral chromatic aberration.
Figure 15:
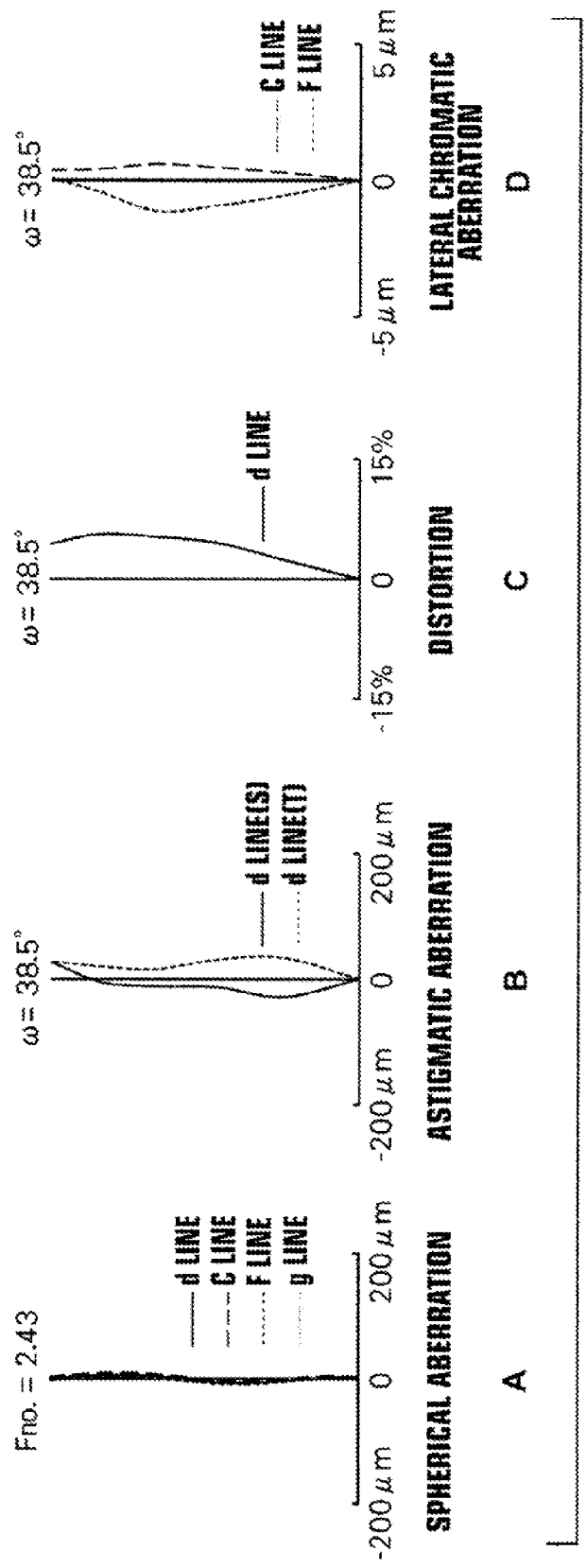
FIG. 15 is a collection of diagrams that illustrate aberrations of the imaging lens of Example 7, wherein A illustrates spherical aberration, B illustrates astigmatic aberration (field curvature), C illustrates distortion, and D illustrates lateral chromatic aberration.
Figure 16:
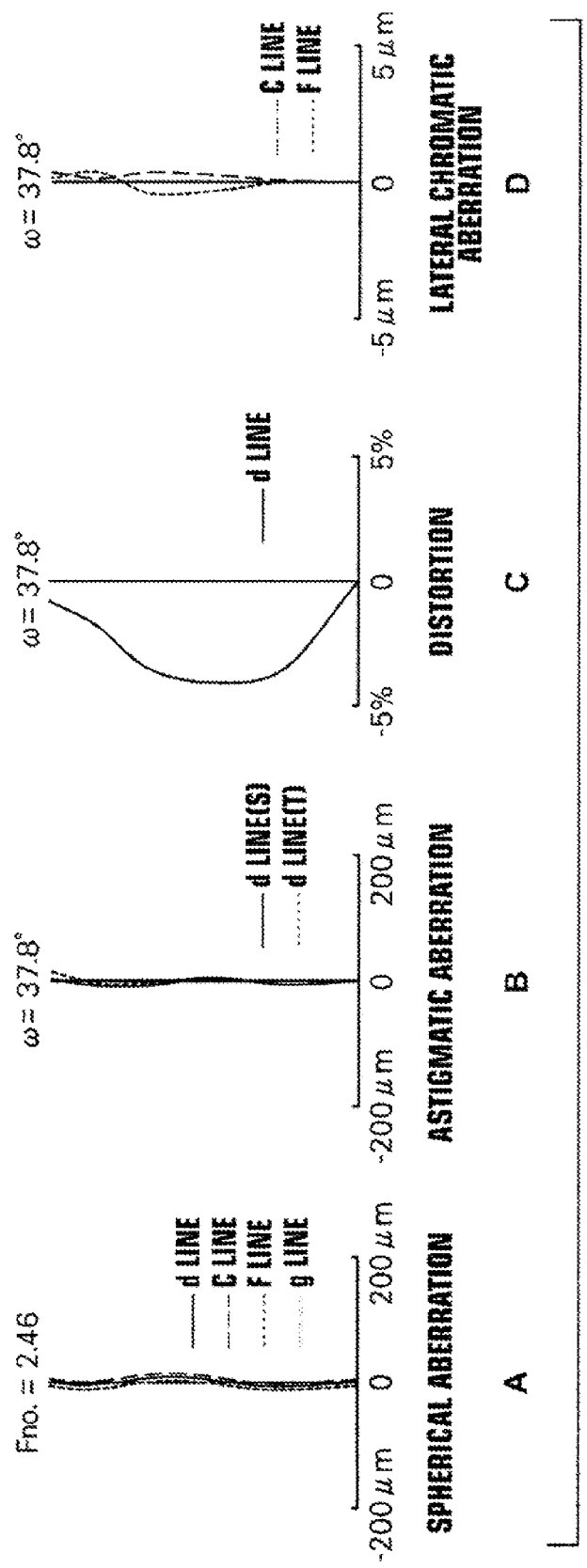
FIG. 16 is a collection of diagrams that illustrate aberrations of the imaging lens of Example 8, wherein A illustrates spherical aberration, B illustrates astigmatic aberration (field curvature), C illustrates distortion, and D illustrates lateral chromatic aberration.

Similarly, the aberrations of the imaging lens of Example 2 are illustrated in A through D of FIG. 10. In addition, the aberrations of the imaging lenses of Examples 3 through 8 are illustrated in FIG. 11 through FIG. 16.

Table 17 shows values corresponding to Conditional Formulae (1) through (5) of Examples 1 through 8.

As can be understood from each set of numerical value data and from the diagrams that illustrate aberrations, each of the Examples realizes high imaging performance and a short total length.

Note that the imaging lens of the present invention is not limited to the embodiments and Examples described above, and various modifications are possible. For example, the values of the radii of curvature, the distances among surfaces, the refractive indices, the Abbe's numbers, the aspherical surface coefficients, etc., are not limited to the numerical values indicated in connection with the Examples, and may be other values.

In addition, the Examples are described under the presumption that they are to be utilized with fixed focus. However, it is also possible for configurations capable of adjusting focus to be adopted. It is possible to adopt a configuration, in which the entirety of the lens system is fed out or a portion of the lenses is moved along the optical axis to enable automatic focus, for example.

TABLE 1

Example 1
f = 4.518, Bf = 0.867, FNo. = 2.43, 2ω = 75.0, TL = 5.466

| Si | Ri | Di | Ndj | Ndj |
|---|---|---|---|---|
| 1 (Aperture Stop) | ∞ | −0.169 | | |
| *2 | 1.8752 | 0.650 | 1.53391 | 55.89 |
| *3 | 15.9866 | 0.100 | | |
| *4 | 5.1292 | 0.350 | 1.63351 | 23.63 |
| *5 | 2.2174 | 0.283 | | |
| *6 | 5.0229 | 0.550 | 1.53391 | 55.89 |
| *7 | 134.2462 | 0.432 | | |
| *8 | −6.5626 | 0.829 | 1.53391 | 55.89 |
| *9 | −1.3461 | 0.108 | | |
| *10 | −2.0863 | 0.450 | 1.63351 | 23.63 |
| *11 | −3.6229 | 0.239 | | |
| *12 | −51.8168 | 0.607 | 1.53391 | 55.89 |
| *13 | 1.5621 | 0.700 | | |
| 14 | ∞ | 0.110 | 1.51633 | 64.14 |
| 15 | ∞ | 0.095 | | |
| 16 (Imaging Surface) | ∞ | | | |

*Aspherical Surface

TABLE 2

Example 2
f = 4.464, Bf = 0.834, FNo. = 2.43, 2ω = 75.0, TL = 5.466

| Si | Ri | Di | Ndj | νdj |
|---|---|---|---|---|
| 1 (Aperture Stop) | ∞ | −0.169 | | |
| *2 | 1.8779 | 0.650 | 1.53391 | 55.89 |
| *3 | 16.7496 | 0.100 | | |
| *4 | 5.1228 | 0.350 | 1.63351 | 23.63 |
| *5 | 2.2273 | 0.291 | | |
| *6 | 4.9917 | 0.552 | 1.53391 | 55.89 |
| *7 | 67.8269 | 0.404 | | |
| *8 | −6.6614 | 0.860 | 1.53391 | 55.89 |
| *9 | −1.3436 | 0.108 | | |
| *10 | −2.0897 | 0.459 | 1.63351 | 23.63 |
| *11 | −3.6142 | 0.242 | | |
| *12 | −65.3422 | 0.614 | 1.53391 | 55.89 |
| *13 | 1.5538 | 0.700 | | |
| 14 | ∞ | 0.110 | 1.51633 | 64.14 |

TABLE 2-continued

Example 2
f = 4.464, Bf = 0.834, FNo. = 2.43, 2ω = 75.0, TL = 5.466

| Si | Ri | Di | Ndj | νdj |
|---|---|---|---|---|
| 15 | ∞ | 0.084 | | |
| 16 (Imaging Surface) | ∞ | | | |

*Aspherical Surface

TABLE 3

Example 3
f = 4.504 Bf = 0.849, FNo. 2.43, 2ω = 74.6, TL = 5.491

| Si | Ri | Di | Ndj | νdj |
|---|---|---|---|---|
| 1 (Aperture Stop) | ∞ | −0.169 | | |
| *2 | 1.8790 | 0.652 | 1.53391 | 55.89 |
| *3 | 16.7399 | 0.104 | | |
| *4 | 5.1576 | 0.351 | 1.63351 | 23.63 |
| *5 | 2.2254 | 0.292 | | |
| *6 | 5.0221 | 0.554 | 1.53391 | 55.89 |
| *7 | 63.8957 | 0.403 | | |
| *8 | −6.6578 | 0.861 | 1.53391 | 55.89 |
| *9 | −1.3435 | 0.111 | | |
| *10 | −2.0881 | 0.457 | 1.63351 | 23.63 |
| *11 | −3.6136 | 0.243 | | |
| *12 | −67.0762 | 0.614 | 1.53391 | 55.89 |
| *13 | 1.5518 | 0.700 | | |
| 14 | ∞ | 0.110 | 1.51633 | 64.14 |
| 15 | ∞ | 0.076 | | |
| 16 (Imaging Surface) | ∞ | | | |

*Aspherical Surface

TABLE 4

Example 4
f = 4.535, Bf = 0.868, FNo. = 2.43, 2ω = 74.0, TL = 5.505

| Si | Ri | Di | Ndj | νdj |
|---|---|---|---|---|
| 1 (Aperture Stop) | ∞ | −0.169 | | |
| *2 | 1.8826 | 0.653 | 1.53391 | 55.89 |
| *3 | 16.7286 | 0.103 | | |
| *4 | 5.1365 | 0.350 | 1.63351 | 23.63 |
| *5 | 2.2251 | 0.294 | | |
| *6 | 5.0361 | 0.558 | 1.53391 | 55.89 |
| *7 | 68.9726 | 0.400 | | |
| *8 | −6.6232 | 0.865 | 1.53391 | 55.89 |
| *9 | −1.3426 | 0.112 | | |
| *10 | −2.0771 | 0.450 | 1.63351 | 23.63 |
| *11 | −3.6313 | 0.240 | | |
| *12 | −79.5581 | 0.612 | 1.53391 | 55.89 |
| *13 | 1.5517 | 0.700 | | |
| 14 | ∞ | 0.110 | 1.51633 | 64.14 |
| 15 | ∞ | 0.095 | | |
| 16 (Imaging Surface) | ∞ | | | |

*Aspherical Surface

TABLE 5

Example 5
f = 4.560, Bf = 0.858, FNo. = 2.43, 2ω = 73.0, TL = 5.515

| Si | Ri | Di | Ndj | νdj |
|---|---|---|---|---|
| 1 (Aperture Stop) | ∞ | −0.169 | | |
| *2 | 1.8810 | 0.690 | 1.53391 | 55.89 |
| *3 | 16.9436 | 0.101 | | |
| *4 | 5.1260 | 0.350 | 1.63351 | 23.63 |
| *5 | 2.2211 | 0.292 | | |
| *6 | 5.0492 | 0.555 | 1.53391 | 55.89 |
| *7 | 68.0528 | 0.400 | | |

TABLE 5-continued

Example 5
f = 4.560, Bf = 0.858, FNo. = 2.43, 2ω = 73.0, TL = 5.515

| Si | Ri | Di | Ndj | νdj |
|---|---|---|---|---|
| *8 | −6.4843 | 0.866 | 1.53391 | 55.89 |
| *9 | −1.3472 | 0.113 | | |
| *10 | −2.0734 | 0.450 | 1.63351 | 23.63 |
| *11 | −3.6255 | 0.238 | | |
| *12 | −90.5233 | 0.603 | 1.53391 | 55.89 |
| *13 | 1.5446 | 0.700 | | |
| 14 | ∞ | 0.110 | 1.51633 | 64.14 |
| 15 | ∞ | 0.085 | | |
| 16 (Imaging Surface) | ∞ | | | |

*Aspherical Surface

TABLE 6

Example 6
f = 4.471, Bf = 0.720, FNo. = 2.43, 2ω = 70.0, TL = 5.515

| Si | Ri | Di | Ndj | νdj |
|---|---|---|---|---|
| 1 (Aperture Stop) | ∞ | −0.169 | | |
| *2 | 1.8866 | 0.745 | 1.53391 | 55.89 |
| *3 | 17.1512 | 0.100 | | |
| *4 | 5.4124 | 0.350 | 1.63351 | 23.63 |
| *5 | 2.2390 | 0.263 | | |
| *6 | 5.0339 | 0.585 | 1.53391 | 55.89 |
| *7 | −45.3211 | 0.459 | | |
| *8 | −5.6888 | 0.881 | 1.53391 | 55.89 |
| *9 | −1.4142 | 0.100 | | |
| *10 | −1.9112 | 0.450 | 1.63351 | 23.63 |
| *11 | −2.9214 | 0.333 | | |
| *12 | −223.2467 | 0.528 | 1.53391 | 55.89 |
| *13 | 1.5404 | 0.450 | | |
| 14 | ∞ | 0.110 | 1.51633 | 64.14 |
| 15 | ∞ | 0.198 | | |
| 16 (Imaging Surface) | ∞ | | | |

*Aspherical Surface

TABLE 7

Example 7
f = 4.216, Bf = 0.805, FNo. = 2.43, 2ω = 77.0, TL = 5.406

| Si | Ri | Di | Ndj | νdj |
|---|---|---|---|---|
| 1 (Aperture Stop) | ∞ | −0.169 | | |
| *2 | 1.8844 | 0.649 | 1.53391 | 55.89 |
| *3 | 15.7650 | 0.100 | | |
| *4 | 5.1724 | 0.354 | 1.63351 | 23.63 |
| *5 | 2.1887 | 0.311 | | |
| *6 | 4.8121 | 0.539 | 1.53391 | 55.89 |
| *7 | 85.1822 | 0.420 | | |
| *8 | −7.7531 | 0.815 | 1.53391 | 55.89 |
| *9 | −1.3596 | 0.171 | | |
| *10 | −2.0916 | 0.604 | 1.63351 | 23.63 |
| *11 | −3.7728 | 0.221 | | |
| *12 | −58.0006 | 0.417 | 1.53391 | 55.89 |
| *13 | 2.0636 | 0.300 | | |
| 14 | ∞ | 0.110 | 1.51633 | 64.14 |
| 15 | ∞ | 0.433 | | |
| 16 (Imaging Surface) | ∞ | | | |

*Aspherical Surface

TABLE 8

Example 8
f = 4.541, Bf = 0.609, FNo. = 2.43, 2ω = 75.6, TL = 5.369

| Si | Ri | Di | Ndj | vdj |
|---|---|---|---|---|
| 1 (Aperture Stop) | ∞ | −0.169 | | |
| *2 | 1.9313 | 0.699 | 1.53391 | 55.89 |
| *3 | 22.1920 | 0.100 | | |
| *4 | 5.7091 | 0.350 | 1.63351 | 23.63 |
| *5 | 2.1923 | 0.265 | | |
| *6 | 4.6227 | 0.518 | 1.53391 | 55.89 |
| *7 | 105.5956 | 0.423 | | |
| *8 | −8.8296 | 0.762 | 1.53391 | 55.89 |
| *9 | −1.3971 | 0.127 | | |

TABLE 8-continued

Example 8
f = 4.541, Bf = 0.609, FNo. = 2.43, 2ω = 75.6, TL = 5.369

| Si | Ri | Di | Ndj | vdj |
|---|---|---|---|---|
| *10 | −1.8639 | 0.634 | 1.58364 | 30.27 |
| *11 | −2.5446 | 0.457 | | |
| *12 | −23.4435 | 0.447 | 1.53391 | 55.89 |
| *13 | 0.9067 | 0.291 | | |
| 14 | ∞ | 0.110 | 1.51633 | 64.14 |
| 15 | ∞ | 0.245 | | |
| 16 (Imaging Surface) | ∞ | | | |

*Aspherical Surface

TABLE 9

Example 1: Aspherical Surface Data

| Surface Number | K | A3 | A4 | A5 | A6 |
|---|---|---|---|---|---|
| 2 | 5.193109E−01 | −5.447354E−02 | 2.292691E−01 | −4.427620E−01 | 5.114856E−01 |
| 3 | 5.000000E+01 | 1.543536E−03 | −2.799014E−02 | 5.965590E−02 | −9.392961E−03 |
| 4 | −4.834840E+00 | 3.631121E−02 | −2.888645E−01 | 6.500453E−01 | −9.680495E−01 |
| 5 | −1.991332E+01 | 5.744030E−02 | −8.074278E−02 | 5.551735E−01 | −1.221753E+00 |
| 6 | 2.323272E+00 | 3.118464E−02 | −9.413811E−02 | −7.916748E−02 | 5.320772E−01 |
| 7 | −5.000000E+01 | −1.902592E−01 | 9.177869E−01 | −2.688716E+00 | 4.791208E+00 |
| 8 | 9.060323E+00 | −1.779618E−02 | 3.698928E−02 | 5.935935E−02 | −3.345528E−01 |
| 9 | −1.086102E+01 | 2.825335E−01 | −3.895047E−01 | −8.225720E−01 | 2.781320E−01 |
| 10 | −3.708039E+01 | 3.300025E−01 | −2.117554E−01 | −2.354852E−01 | 1.308170E−01 |
| 11 | −5.000000E+01 | 2.011025E−01 | −1.215072E−01 | −1.245902E−01 | 5.805158E−02 |
| 12 | 5.000001E+01 | 1.628297E−01 | −4.879558E−01 | 2.705169E−01 | −5.021173E−03 |
| 13 | −6.185330E+00 | 5.186734E−02 | −2.628894E−01 | 2.290197E−01 | −7.993293E−02 |

| | A7 | A8 | A9 | A10 |
|---|---|---|---|---|
| 2 | −3.218191E−01 | 1.334849E−01 | −6.204166E−02 | 2.532968E−02 |
| 3 | −1.781365E−02 | −5.077875E−03 | 9.837076E−03 | −1.977382E−03 |
| 4 | 9.606194E−01 | −6.096039E−01 | 2.128046E−01 | −3.774622E−02 |
| 5 | 1.346759E+00 | −7.809080E−01 | 2.086885E−01 | −1.482585E−02 |
| 6 | −8.019909E−01 | 5.270956E−01 | −1.230446E−01 | −1.540664E−04 |
| 7 | −5.606875E+00 | 4.249326E+00 | −1.924712E+00 | 3.995757E−01 |
| 8 | 4.194717E−01 | −2.204471E−01 | 3.072058E−02 | 3.865754E−03 |
| 9 | −1.268307E−01 | 4.540316E−02 | −2.232770E−02 | 4.625191E−03 |
| 10 | 5.821524E−02 | −3.125579E−02 | −4.412599E−03 | 2.430382E−03 |
| 11 | 2.501786E−02 | −1.049155E−02 | −1.561480E−03 | 6.329388E−04 |
| 12 | −4.466052E−02 | 2.144666E−02 | −5.249010E−03 | 5.577315E−04 |
| 13 | 9.233303E−04 | 8.076087E−03 | −2.437536E−03 | 2.401122E−04 |

TABLE 10

Example 2: Aspherical Surface Data

| Surface Number | K | A3 | A4 | A5 | A6 |
|---|---|---|---|---|---|
| 2 | 5.139557E−01 | −5.228226E−02 | 2.272512E−01 | −4.488526E−01 | 5.194808E−01 |
| 3 | 1.000000E+00 | −1.759574E−03 | −2.830239E−02 | 6.295776E−02 | −9.005610E−03 |
| 4 | −4.915803E+00 | 3.411811E−02 | −2.889386E−01 | 6.537888E−01 | −9.704512E−01 |
| 5 | −1.985191E+01 | 5.527058E−02 | −8.075274E−02 | 5.598232E−01 | −1.226838E+00 |
| 6 | 2.598139E+00 | 3.114726E−02 | −9.699387E−02 | −8.037441E−02 | 5.384692E−01 |
| 7 | 1.000000E+00 | −1.893655E−01 | 9.133743E−01 | −2.685346E+00 | 4.783731E+00 |
| 8 | 6.794719E+00 | −1.683145E−02 | 3.377313E−02 | 5.772894E−02 | −3.292496E−01 |
| 9 | −1.094277E+01 | 2.843494E−01 | −3.934877E−01 | −8.210970E−02 | 2.839862E−01 |
| 10 | −3.716815E+01 | 3.296948E−01 | −2.103225E−01 | −2.340913E−01 | 1.302677E−01 |
| 11 | −5.000001E+01 | 2.004386E−01 | −1.219345E−01 | −1.251501E−01 | 5.844234E−02 |
| 12 | 1.000000E+00 | 1.674636E−01 | −4.903304E−01 | 2.686648E−01 | −4.285135E−03 |
| 13 | −6.185480E+00 | 5.691795E−02 | −2.606303E−01 | 2.277898E−01 | −8.013343E−02 |

| | A7 | A8 | A9 | A10 |
|---|---|---|---|---|
| 2 | −3.162373E−01 | 1.247383E−01 | −6.610419E−02 | 3.052971E−02 |
| 3 | −1.907486E−02 | −5.204214E−03 | 9.972907E−03 | −1.950937E−03 |
| 4 | 9.610967E−01 | −6.106226E−01 | 2.136715E−01 | −3.794279E−02 |
| 5 | 1.351893E+00 | −7.849332E−01 | 2.099441E−01 | −1.486701E−02 |
| 6 | −8.074963E−01 | 5.306347E−01 | −1.245342E−01 | 4.126426E−05 |
| 7 | −5.591039E+00 | 4.235805E+00 | −1.920355E+00 | 3.993472E−01 |

TABLE 10-continued

Example 2: Aspherical Surface Data

| | | | | |
|---|---|---|---|---|
| 8 | 4.147531E−01 | −2.177597E−01 | 3.010953E−02 | 3.864735E−03 |
| 9 | −1.304960E−01 | 4.672722E−02 | −2.304395E−02 | 4.803991E−03 |
| 10 | 5.757226E−02 | −3.104894E−02 | −4.373892E−03 | 2.417269E−03 |
| 11 | 2.517882E−02 | −1.055096E−02 | −1.583451E−03 | 6.394320E−04 |
| 12 | −4.452678E−02 | 2.141531E−02 | −5.263180E−03 | 5.601866E−04 |
| 13 | 1.036812E−03 | 8.095976E−03 | −2.445080E−03 | 2.400271E−04 |

TABLE 11

Example 3: Aspherical Surface Data

| Surface Number | K | A3 | A4 | A5 | A6 |
|---|---|---|---|---|---|
| 2 | 5.145555E−01 | −5.126994E−02 | 2.275450E−01 | −4.524428E−01 | 5.218909E−01 |
| 3 | 1.000000E+00 | −1.590221E−03 | −2.835960E−02 | 6.255643E−02 | −9.036198E−03 |
| 4 | −5.722260E+00 | 3.451848E−02 | −2.689244E−01 | 6.527461E−01 | −9.697904E−01 |
| 5 | −1.988303E+01 | 5.468075E−02 | −8.080219E−02 | 5.605577E−01 | −1.226541E+00 |
| 6 | 2.686679E+00 | 3.075399E−02 | −9.813869E−02 | −7.934149E−02 | 5.399130E−01 |
| 7 | 1.000000E+00 | −1.881716E−01 | 9.127142E−01 | −2.684704E+00 | 4.777738E+00 |
| 8 | 6.904223E+00 | −1.751010E−02 | 3.427419E−02 | 5.818161E−02 | −3.295497E−01 |
| 9 | −1.090094E+01 | 2.843673E−01 | −3.934744E−01 | −8.157869E−02 | 2.829076E−01 |
| 10 | −3.770394E+01 | 3.300695E−01 | −2.115305E−01 | −2.347197E−01 | 1.308406E−01 |
| 11 | −5.000001E+01 | 1.992809E−01 | −1.221163E−01 | −1.245696E−01 | 5.843930E−02 |
| 12 | 1.000000E+00 | 1.701222E−01 | −4.914378E−01 | 2.692740E−01 | −4.393523E−03 |
| 13 | −6.196767E+00 | 5.551786E−02 | −2.501276E−01 | 2.165948E−01 | −7.580895E−02 |

| | A7 | A8 | A9 | A10 |
|---|---|---|---|---|
| 2 | −3.125776E−01 | 1.221513E−01 | −6.780068E−02 | 3.158211E−02 |
| 3 | −1.890413E−02 | −5.126162E−03 | 9.911293E−03 | −1.951214E−03 |
| 4 | 9.605503E−01 | −6.094396E−01 | 2.129129E−01 | −3.781955E−02 |
| 5 | 1.351093E+00 | −7.845234E−01 | 2.097154E−01 | −1.477974E−02 |
| 6 | −8.092272E−01 | 5.310966E−01 | −1.245003E−01 | 2.705227E−05 |
| 7 | −5.582014E+00 | 4.230276E+00 | −1.918378E+00 | 3.988871E−01 |
| 8 | 4.148069E−01 | −2.178141E−01 | 3.011585E−02 | 3.870792E−03 |
| 9 | −1.296385E−01 | 4.627437E−02 | −2.289144E−02 | 4.781882E−03 |
| 10 | 5.780987E−02 | −3.117496E−02 | −4.397722E−03 | 2.426291E−03 |
| 11 | 2.505056E−02 | −1.053494E−02 | −1.576036E−03 | 6.382421E−04 |
| 12 | −4.479166E−02 | 2.161262E−02 | −5.316457E−03 | 5.654416E−04 |
| 13 | 1.138911E−03 | 7.480604E−03 | −2.244030E−03 | 2.175701E−04 |

TABLE 12

Example 4: Aspherical Surface Data

| Surface Number | K | A3 | A4 | A5 | A6 |
|---|---|---|---|---|---|
| 2 | 5.139480E−01 | −4.736959E−02 | 2.252655E−01 | −4.607237E−01 | 5.300326E−01 |
| 3 | 1.000000E+00 | −2.662826E−03 | −2.756643E−02 | 6.297201E−02 | −1.017412E−02 |
| 4 | −5.651138E+00 | 3.397578E−02 | −2.902042E−01 | 6.539294E−01 | −9.684177E−01 |
| 5 | −1.986481E+01 | 5.390472E−02 | −8.112521E−02 | 5.605883E−01 | −1.223993E+00 |
| 6 | 2.673968E+00 | 3.098342E−02 | −1.016831E−01 | −8.043919E−02 | 5.436782E−01 |
| 7 | 1.000000E+00 | −1.873971E−01 | 9.102506E−01 | −2.690764E+00 | 4.788555E+00 |
| 8 | 6.933558E+00 | −1.781659E−02 | 3.294899E−02 | 5.814100E−02 | −3.315773E−01 |
| 9 | −1.088113E+01 | 2.835860E−01 | −3.907164E−01 | −8.241134E−02 | 2.807972E−01 |
| 10 | −3.758625E+01 | 3.324405E−01 | −2.113678E−01 | −2.362586E−01 | 1.308282E−01 |
| 11 | −5.000001E+01 | 1.990467E−01 | −1.208289E−01 | −1.238662E−01 | 5.794407E−02 |
| 12 | 1.000000E+00 | 1.716799E−01 | −4.884708E−01 | 2.666080E−01 | −4.286719E−03 |
| 13 | −6.184650E+00 | 5.179683E−02 | −2.325857E−01 | 1.978766E−01 | −6.867460E−02 |

| | A7 | A8 | A9 | A10 |
|---|---|---|---|---|
| 2 | −3.032658E−01 | 1.108685E−01 | −7.065496E−02 | 3.579819E−02 |
| 3 | −1.873208E−02 | −4.838716E−03 | 9.964282E−03 | −2.029884E−03 |
| 4 | 9.609424E−01 | −6.113912E−01 | 2.133919E−01 | −3.767461E−02 |
| 5 | 1.347544E+00 | −7.819827E−01 | 2.085289E−01 | −1.451134E−02 |
| 6 | −8.070396E−01 | 5.278226E−01 | −1.244953E−01 | 4.696010E−04 |
| 7 | −5.589037E+00 | 4.235752E+00 | −1.922079E+00 | 3.997674E−01 |
| 8 | 4.181951E−01 | −2.197509E−01 | 3.028683E−02 | 3.960866E−03 |
| 9 | −1.288506E−01 | 4.630922E−02 | −2.274705E−02 | 4.716840E−03 |
| 10 | 5.838513E−02 | −3.125027E−02 | −4.434849E−03 | 2.429582E−03 |
| 11 | 2.489031E−02 | −1.048742E−02 | −1.555971E−03 | 6.344253E−04 |

TABLE 12-continued

Example 4: Aspherical Surface Data

| 12 | −4.425513E−02 | 2.133392E−02 | −5.242688E−03 | 5.568106E−04 |
| 13 | 1.245139E−03 | 6.539876E−03 | −1.933594E−03 | 1.826361E−04 |

TABLE 13

Example 5: Aspherical Surface Data

| Surface Number | K | A3 | A4 | A5 | A6 |
|---|---|---|---|---|---|
| 2 | 5.141717E−01 | −4.542022E−02 | 2.227971E−01 | −4.637770E−01 | 5.362708E−01 |
| 3 | 1.000000E+00 | −3.552389E−03 | −2.690950E−02 | 6.413825E−02 | −1.071136E−02 |
| 4 | −5.651141E+00 | 3.241612E−02 | −2.892348E−01 | 6.548667E−01 | −9.679633E−01 |
| 5 | −1.986467E+01 | 5.366396E−02 | −8.288844E−02 | 5.649746E−01 | −1.232282E+00 |
| 6 | 2.873981E+00 | 3.060458E−02 | −1.018024E−01 | −8.112926E−02 | 5.452568E−01 |
| 7 | 1.000000E+00 | −1.865238E−01 | 9.113655E−01 | −2.694372E+00 | 4.791181E+00 |
| 8 | 6.933568E+00 | −1.928485E−02 | 3.339912E−02 | 5.935725E−02 | −3.327654E−01 |
| 9 | −1.088132E+01 | 2.861973E−01 | −3.904652E−01 | −8.384052E−02 | 2.813597E−01 |
| 10 | −3.758622E+01 | 3.330488E−01 | −2.102184E−01 | −2.372912E−01 | 1.298247E−01 |
| 11 | −5.000001E+01 | 2.009924E−01 | −1.192349E−01 | −1.256311E−01 | 5.766910E−02 |
| 12 | 1.000000E+00 | 1.715498E−01 | −4.826053E−01 | 2.630428E−01 | −4.335033E−03 |
| 13 | −6.184508E+00 | 5.195024E−02 | −2.309797E−01 | 1.959186E−01 | −6.795436E−02 |

| | A7 | A8 | A9 | A10 |
|---|---|---|---|---|
| 2 | −2.999838E−01 | 1.018924E−01 | −7.059193E−02 | 3.877648E−02 |
| 3 | −1.948448E−02 | −4.498803E−03 | 9.999419E−03 | −2.039262E−03 |
| 4 | 9.575763E−01 | −6.083143E−01 | 2.124178E−01 | −3.759785E−02 |
| 5 | 1.360768E+00 | −7.932216E−01 | 2.126767E−01 | −1.497397E−02 |
| 6 | −8.077608E−01 | 5.281818E−01 | −1.250287E−01 | 6.825983E−04 |
| 7 | −5.592787E+00 | 4.240654E+00 | −1.923964E+00 | 3.997009E−01 |
| 8 | 4.184911E−01 | −2.199863E−01 | 3.049038E−02 | 3.917494E−03 |
| 9 | −1.287938E−01 | 4.636963E−01 | −2.281636E−01 | 4.729575E−02 |
| 10 | 5.859805E−02 | −3.079854E−02 | −4.494786E−03 | 2.391999E−03 |
| 11 | 2.528992E−02 | −1.046181E−02 | −1.588111E−03 | 6.353772E−04 |
| 12 | −4.357778E−02 | 2.099193E−02 | −5.140682E−03 | 5.434476E−04 |
| 13 | 1.223607E−03 | 6.476056E−03 | −1.909037E−03 | 1.793178E−04 |

TABLE 14

Example 6: Aspherical Surface Data

| Surface Number | K | A3 | A4 | A5 | A6 |
|---|---|---|---|---|---|
| 1 | 5.490595E−01 | −3.192993E−02 | 1.732194E−01 | −3.834406E−01 | 4.728799E−01 |
| 2 | 1.000000E+00 | −6.116964E−03 | −3.353068E−02 | 6.784365E−02 | −3.225177E−03 |
| 4 | −4.917048E+00 | 2.362363E−02 | −2.928375E−01 | 6.438034E−01 | −9.344855E−01 |
| 6 | −1.984595E+01 | 5.242250E−02 | −9.347578E−02 | 5.386133E−01 | −1.145899E+00 |
| 6 | 2.581306E+00 | 2.629078E−02 | −8.392240E−02 | −7.844016E−02 | 5.003376E−01 |
| 7 | 1.000000E+00 | −1.888956E−01 | 9.054225E−01 | −2.662125E+00 | 4.782695E+00 |
| 8 | 6.955446E+00 | −4.131907E−02 | 4.078593E−02 | 6.519721E−02 | −3.383379E−01 |
| 9 | −1.093747E+01 | 3.076950E−01 | −3.996958E−01 | −9.358216E−02 | 2.919023E−01 |
| 10 | −3.718850E+01 | 3.039595E−01 | −1.867865E−01 | −2.218448E−01 | 1.197189E−01 |
| 11 | −4.993413E+01 | 1.706364E−01 | −9.530724E−02 | −1.013609E−01 | 4.209292E−02 |
| 12 | 1.000000E+00 | 1.340894E−01 | −3.518146E−01 | 1.796512E−01 | −3.728605E−03 |
| 13 | −6.230841E+00 | 1.555044E−02 | −1.269283E−01 | 1.008677E−01 | −3.035390E−02 |

| | A7 | A8 | A9 | A10 |
|---|---|---|---|---|
| 1 | −2.766208E−01 | 7.919794E−02 | −3.613448E−02 | 2.227974E−02 |
| 2 | −2.028685E−02 | −7.575531E−03 | 1.035606E−02 | −1.768155E−03 |
| 4 | 9.329141E−01 | −5.954530E−01 | 2.050944E−01 | −3.538356E−02 |
| 5 | 1.265376E+00 | −7.388771E−01 | 1.960971E−01 | −1.286422E−02 |
| 6 | −7.419228E−01 | 4.858953E−01 | −1.138503E−01 | −1.084614E−04 |
| 7 | −5.616677E+00 | 4.253222E+00 | −1.916252E+00 | 3.950292E−01 |
| 8 | 4.191454E−01 | −2.190629E−01 | 3.063043E−02 | 3.720446E−03 |
| 9 | −1.274069E−01 | 4.411206E−02 | −2.303454E−02 | 4.981183E−03 |
| 10 | 5.637674E−02 | −2.851166E−02 | −4.413282E−03 | 2.170967E−03 |
| 11 | 1.938199E−02 | −6.873954E−03 | −1.158546E−03 | 3.720302E−04 |
| 12 | −2.539501E−02 | 1.148123E−02 | −2.598364E−03 | 2.917666E−04 |
| 13 | 9.893289E−05 | 2.213694E−03 | −5.203307E−04 | 3.885395E−05 |

TABLE 15

Example 7: Aspherical Surface Data

| Surface Number | K | A3 | A4 | A5 | A6 |
|---|---|---|---|---|---|
| 2 | 5.147340E−01 | −5.044962E−02 | 2.284568E−01 | −4.438802E−01 | 5.113400E−01 |
| 3 | 4.892535E+01 | −1.350735E−03 | −2.604294E−02 | 6.179051E−02 | −7.299938E−03 |
| 4 | −4.808875E+00 | 3.700628E−02 | −2.896247E−01 | 6.454663E−01 | −9.678768E−01 |
| 5 | −1.990603E+01 | 5.821098E−02 | −8.001037E−02 | 5.566437E−01 | −1.220848E+00 |
| 6 | 2.316260E+00 | 3.061448E−02 | −9.370240E−02 | −7.909435E−02 | 5.319752E−01 |
| 7 | −3.323701E+04 | −1.868140E−01 | 9.170755E−01 | −2.689060E+00 | 4.790919E+00 |
| 8 | 1.024513E+01 | −2.676350E−02 | 3.891735E−02 | 5.960856E−02 | −3.350216E−01 |
| 9 | −1.089811E+01 | 2.855957E−01 | −3.908204E−01 | −8.230664E−02 | 2.780919E−01 |
| 10 | −3.669288E+01 | 3.324415E−01 | −2.110745E−01 | −2.354438E−01 | 1.308189E−01 |
| 11 | −5.039519E+01 | 2.009570E−01 | −1.215653E−01 | −1.245869E−01 | 5.805318E−02 |
| 12 | 6.801886E+01 | 1.617696E−01 | −4.880019E−01 | 2.705158E−01 | −5.022005E−03 |
| 13 | −6.002671E+00 | 5.858718E−02 | −2.628532E−01 | 2.289331E−01 | −7.996140E−02 |

| | A7 | A8 | A9 | A10 | |
|---|---|---|---|---|---|
| 2 | −3.212543E−01 | 1.341251E−01 | −6.192107E−02 | 2.696919E−02 | |
| 3 | −1.711780E−02 | −4.415550E−03 | 1.156494E−02 | 5.483393E−04 | |
| 4 | 9.656284E−01 | −6.021492E−01 | 2.168046E−01 | −4.668295E−02 | |
| 5 | 1.337199E+00 | −7.706932E−01 | 2.140498E−01 | −2.327551E−02 | |
| 6 | −8.018510E−01 | 5.271437E−01 | −1.231141E−01 | −3.332056E−04 | |
| 7 | −5.608950E+00 | 4.249287E+00 | −1.924759E+00 | 3.995238E−01 | |
| 8 | 4.196185E−01 | −2.203374E−01 | 3.075581E−02 | 3.897703E−03 | |
| 9 | −1.268654E−01 | 4.538595E−02 | −2.233627E−02 | 4.620578E−03 | |
| 10 | 5.821255E−02 | −3.126881E−02 | −4.414368E−03 | 2.428079E−03 | |
| 11 | 2.501876E−02 | −1.049170E−02 | −1.561444E−03 | 6.329665E−04 | |
| 12 | −4.466006E−02 | 2.144690E−02 | −5.249028E−03 | 5.577392E−04 | |
| 13 | 9.149897E−04 | 8.073035E−03 | −2.436329E−03 | 2.399016E−04 | |

TABLE 16

Example 8: Aspherical Surface Data

| Surface Number | K | A3 | A4 | A5 | A6 |
|---|---|---|---|---|---|
| 2 | 4.542177E−01 | −4.517282E−02 | 2.140508E−01 | −4.392219E−01 | 5.204446E−01 |
| 3 | 1.129655E+02 | −8.758040E−03 | −9.813681E−03 | 6.438027E−02 | −7.316891E−03 |
| 4 | −4.535967E+00 | 3.309442E−02 | −2.838651E−01 | 6.441052E−01 | −9.566389E−01 |
| 5 | −1.990621E+01 | 5.853392E−02 | −8.205568E−02 | 5.521457E−01 | −1.232915E+00 |
| 6 | 2.352916E+00 | 2.681427E−02 | −9.379135E−02 | −7.968788E−02 | 5.305567E−01 |
| 7 | −2.082223E+05 | −1.916082E−01 | 9.144492E−01 | −2.690038E+00 | 4.788986E+00 |
| 8 | 7.145863E+00 | −2.471848E−02 | 5.057512E−02 | 5.977556E−02 | −3.388618E−01 |
| 9 | −9.987260E+00 | 3.117311E−01 | −3.908308E−01 | −8.308982E−02 | 2.778568E−01 |
| 10 | −4.162862E+01 | 3.164430E−01 | −2.066387E−01 | −2.337212E−01 | 1.312042E−01 |
| 11 | −1.029164E+02 | 2.079876E−01 | −1.231036E−01 | −1.250228E+01 | 5.795268E−02 |
| 12 | 4.868783E+01 | 1.602896E−01 | −4.877838E−01 | 2.706570E−01 | −4.986616E−03 |
| 13 | −9.901993E+00 | 4.907455E−02 | −2.590934E−01 | 2.297695E−01 | −7.980681E−02 |

| | A7 | A8 | A9 | A10 | |
|---|---|---|---|---|---|
| 2 | −3.173928E−01 | 1.298594E−01 | −7.530875E−02 | 3.629082E−02 | |
| 3 | −2.081266E−02 | −2.910226E−04 | 1.117349E−02 | 1.548474E−03 | |
| 4 | 9.807403E−01 | −5.985192E−01 | 1.699997E−01 | −2.133761E−02 | |
| 5 | 1.380648E+00 | −7.464214E−01 | 1.300810E−01 | 1.276997E−02 | |
| 6 | −8.016374E−01 | 5.271667E−01 | −1.234345E−01 | −8.401109E−04 | |
| 7 | −5.607526E+00 | 4.248615E+00 | −1.925369E+00 | 3.989982E−01 | |
| 8 | 4.191656E−01 | −2.198686E−01 | 3.143550E−02 | 4.414800E−03 | |
| 9 | −1.269126E−01 | 4.540132E−02 | −2.230781E−02 | 4.642301E−03 | |
| 10 | 5.812375E−02 | −3.130111E−02 | −4.479031E−03 | 2.397618E−03 | |
| 11 | 2.499908E−02 | −1.049878E−02 | −1.562976E−03 | 8.326398E−04 | |
| 12 | −4.464538E−02 | 2.145186E−02 | −5.248360E−03 | 5.579262E−04 | |
| 13 | 9.359499E−04 | 8.068648E−03 | −2.440841E−03 | 2.387624E−04 | |

TABLE 17

Values Related to Conditional Formulae

| Number | Formula | Example 1 | Example 2 | Example 3 | Example 4 | Example 5 | Example 6 | Example 7 | Example 8 |
|---|---|---|---|---|---|---|---|---|---|
| 1 | f/f6 | −1.597 | −1.576 | −1.590 | −1.595 | −1.606 | −1.562 | −1.132 | −2.795 |
| 2 | vd5 | 23.63 | 23.63 | 23.63 | 23.63 | 23.63 | 23.63 | 23.63 | 30.27 |
| 3 | f123 | 0.970 | 0.958 | 0.958 | 0.965 | 0.973 | 0.998 | 0.889 | 0.945 |

TABLE 17-continued

Values Related to Conditional Formulae

| Number | Formula | Example 1 | Example 2 | Example 3 | Example 4 | Example 5 | Example 6 | Example 7 | Example 8 |
|---|---|---|---|---|---|---|---|---|---|
| 4 | f3/f1 | 2.492 | 2.578 | 2.606 | 2.592 | 2.611 | 2.182 | 2.416 | 2.309 |
| 5 | f6/f2 | 0.437 | 0.434 | 0.437 | 0.437 | 0.437 | 0.455 | 0.593 | 0.278 |

What is claimed is:

1. An imaging lens substantially consisting of six lenses, including;
a first lens having a positive refractive power and a convex surface that faces an object side;
a second lens having a negative refractive power, which is a meniscus lens having a convex surface toward the object side;
a third lens having a positive refractive power;
a fourth lens having a positive refractive power;
a fifth lens having a negative refractive power and a concave surface that faces the object side; and
a sixth lens having a negative refractive power, which is of an aspherical shape having a surface which is concave toward an image side in the vicinity of an optical axis and convex toward the image side at the peripheral portion thereof; in this order from the object side; and satisfying the following conditional formula:

$$-4.0 < f/f6 < -0.8 \quad (1)$$

wherein f is the focal length of the entire system, and f6 is the focal length of the sixth lens.

2. An imaging lens as defined in claim 1, wherein:
the first lens is a meniscus lens having a convex surface that faces the object side.

3. An imaging lens as defined in claim 1, wherein:
the fourth lens is a meniscus lens having a concave surface that faces the object side.

4. An imaging lens as defined in claim 1 that further satisfies the following conditional formula:

$$vd5 < 35 \quad (2)$$

wherein vd5 is the Abbe's number of the fifth lens with respect to the d line.

5. An imaging lens as defined in claim 1, wherein:
the fifth lens is of an aspherical shape having an inflection point thereon.

6. An imaging lens as defined in claim 1 that further satisfies the following conditional formula:

$$0.8 < f/f123 < 1.3 \quad (3)$$

wherein f is the focal length of the entire system, and f123 is the combined focal length of the first through third lenses.

7. An imaging lens as defined in claim 1 that further satisfies the following conditional formula:

$$1 < f3/f1 < 5 \quad (4)$$

wherein f1 is the focal length of the first lens, and f3 is the focal length of the third lens.

8. An imaging lens as defined in claim 1 that further satisfies the following conditional formula:

$$0.15 < f6/f2 < 1.30 \quad (5)$$

wherein f2 is the focal length of the second lens, and f6 is the focal length of the sixth lens.

9. An imaging lens as defined in claim 1 that further satisfies the following conditional formula:

$$-3.0 < f/f6 < -1.0 \quad (1\text{-}1).$$

10. An imaging lens as defined in claim 9 that further satisfies the following conditional formula:

$$-2.0 < f/f6 < -1.1 \quad (1\text{-}2).$$

11. An imaging lens as defined in claim 1 that further satisfies the following conditional formula:

$$vd5 < 31 \quad (2\text{-}2)$$

wherein vd5 is the Abbe's number of the fifth lens with respect to the d line.

12. An imaging lens as defined in claim 1 that further satisfies the following conditional formula:

$$0.85 < f/f123 < 1.1 \quad (3\text{-}1)$$

wherein f123 is the combined focal length of the first through third lenses.

13. An imaging lens as defined in claim 12 that further satisfies the following conditional formula:

$$0.9 < f/f123 < 1.0 \quad (3\text{-}2).$$

14. An imaging lens as defined in claim 1 that further satisfies the following conditional formula:

$$1.5 < f3/f1 < 4 \quad (4\text{-}1)$$

wherein f1 is the focal length of the first lens and f3 is the focal length of the third lens.

15. An imaging lens as defined in claim 14 that further satisfies the following conditional formula:

$$2 < f3/f1 < 3 \quad (4\text{-}2).$$

16. An imaging lens as defined in claim 1 that further satisfies the following conditional formula:

$$0.2 < f6/f2 < 0.7 \quad (5\text{-}1)$$

wherein f2 is the focal length of the second lens, and f6 is the focal length of the sixth lens.

17. An imaging lens as defined in claim 16 that further satisfies the following conditional formula:

$$0.25 < f6/f2 < 0.5 \quad (5\text{-}2).$$

18. An imaging apparatus equipped with an imaging lens as defined in claim 1.

* * * * *